US008532877B2

(12) United States Patent
Oikawa

(10) Patent No.: US 8,532,877 B2
(45) Date of Patent: Sep. 10, 2013

(54) COAXIAL TWO-WHEELED VEHICLE AND ITS CONTROL METHOD

(75) Inventor: Susumu Oikawa, Yokohama (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 0 days.

(21) Appl. No.: 13/056,063

(22) PCT Filed: Jun. 5, 2009

(86) PCT No.: PCT/JP2009/002542
§ 371 (c)(1),
(2), (4) Date: Jan. 26, 2011

(87) PCT Pub. No.: WO2010/013381
PCT Pub. Date: Feb. 4, 2010

(65) Prior Publication Data
US 2011/0130925 A1   Jun. 2, 2011

(30) Foreign Application Priority Data

Jul. 29, 2008  (JP) ................. 2008-194848
Jul. 29, 2008  (JP) ................. 2008-194849
Jul. 31, 2008  (JP) ................. 2008-197814

(51) Int. Cl.
*A01B 69/00*   (2006.01)
(52) U.S. Cl.
USPC ............................ 701/41; 180/218
(58) Field of Classification Search
USPC .................... 701/41; 180/218, 6.5
See application file for complete search history.

(56) References Cited

U.S. PATENT DOCUMENTS

| 4,059,786 | A  |   | 11/1977 | Jones et al. |
| 4,511,825 | A  |   | 4/1985  | Klimo |
| 7,138,772 | B2 | * | 11/2006 | Noro et al. ............ 318/400.01 |
| 7,178,614 | B2 |   | 2/2007  | Iishi |
| 7,363,993 | B2 | * | 4/2008  | Ishii .......................... 180/7.1 |

(Continued)

FOREIGN PATENT DOCUMENTS

| CN | 1857959 A   | 11/2006 |
| JP | 62-181985 A1 | 8/1987 |

(Continued)

OTHER PUBLICATIONS

Supplementary European Search Report of EP 09802631.3-2205 dated Feb. 22, 2012.

(Continued)

*Primary Examiner* — Thomas Black
*Assistant Examiner* — Shardul Patel
(74) *Attorney, Agent, or Firm* — Kenyon & Kenyon LLP

(57) ABSTRACT

To provide a coaxial two-wheeled vehicle capable of performing a turning movement with stability and its control method. A coaxial two-wheeled vehicle in accordance with the present invention includes drive means to drive two coaxially-arranged wheels, turning reference-input input means to input a turning reference input, and control means to control the drive means according to a turning gain based on a turning reference-input input by the turning reference-input input means to thereby perform a turning movement. The control means preferably brings the turning gain to substantially zero when the coaxial two-wheeled vehicle is in a backward traveling state with a backward speed greater than or equal to a first speed, and sets the turning gain to a value greater than zero when a vehicle speed is substantially zero.

11 Claims, 16 Drawing Sheets

(56) References Cited

U.S. PATENT DOCUMENTS

| | | | |
|---|---|---|---|
| 7,717,200 B2* | 5/2010 | Kakinuma et al. | 180/6.5 |
| 7,866,430 B2* | 1/2011 | Kakinuma et al. | 180/218 |
| 7,958,956 B2* | 6/2011 | Kakinuma et al. | 180/65.1 |
| 8,028,777 B2* | 10/2011 | Kakinuma et al. | 180/65.1 |
| 8,165,771 B2* | 4/2012 | Doi | 701/72 |
| 2003/0226698 A1* | 12/2003 | Kamen et al. | 180/65.1 |
| 2004/0005958 A1* | 1/2004 | Kamen et al. | 482/51 |
| 2006/0260857 A1 | 11/2006 | Kakinuma | |
| 2007/0251735 A1* | 11/2007 | Kakinuma et al. | 180/6.5 |
| 2008/0099265 A1* | 5/2008 | Kamen et al. | 180/204 |
| 2008/0105480 A1* | 5/2008 | Kamen et al. | 180/204 |
| 2010/0033315 A1* | 2/2010 | Kamen et al. | 340/441 |
| 2011/0221160 A1* | 9/2011 | Shaw | 280/205 |

FOREIGN PATENT DOCUMENTS

| | | |
|---|---|---|
| JP | 04-201793 A1 | 7/1992 |
| JP | 2000-053013 A1 | 2/2000 |
| JP | 3722493 A1 | 9/2005 |
| JP | 2006-109547 A | 4/2006 |
| JP | 2006-315666 A1 | 11/2006 |
| JP | 2008-056037 A | 3/2008 |
| JP | 2008-056064 A1 | 3/2008 |
| JP | 2008-056065 A1 | 3/2008 |
| JP | 2008-056066 A1 | 3/2008 |
| JP | 2008-056067 A1 | 3/2008 |
| WO | 02/30730 A2 | 4/2002 |
| WO | 2008/026725 A1 | 3/2008 |
| WO | 2008/026770 A1 | 3/2008 |

OTHER PUBLICATIONS

Office Action issued Sep. 21, 2012 in U.S. Appl. No. 13/481,136.
Notice of Allowance mailed Dec. 31, 2012 in U.S. Appl. No. 13/056,063.
Notice of Allowance mailed May 28, 2013 in co-pending divisional U.S. Appl. No. 13/481,136.

* cited by examiner

COAXIAL TWO-WHEELED VEHICLE AND ITS CONTROL METHOD

TECHNICAL FIELD

This is a 371 national phase application of PCT/JP2009/002542 filed 05Jun. 2009, claiming priority to Japanese Patent Applications No. JP 2008-194848 filed 29 Jul. 2008, JP 2008-194849 filed 29 Jul. 2008, and JP 2008-197814 filed 31 Jul. 2008, respectively, the contents of which are incorporated herein by reference.

The present invention relates to a coaxial two-wheeled vehicle and a control method for a coaxial two-wheeled vehicle, in particular to a turning traveling technique.

BACKGROUND ART

In recent years, moving bodies that detect information about their own posture by using a gyroscopic sensor, an acceleration sensor, or the like, and perform drive control based on the detected posture information have been developed. In such moving bodies, information about their own posture is detected from measurement signals supplied from gyroscopic sensors and acceleration sensors; rotation reference inputs to motors are calculated based on a principle for controlling a posture by an inverted pendulum or a principle of ZMP (Zero Moment Point) control for a bipedal walking robot so that their own posture is maintained; and the rotation reference input data is transmitted to the motor control portions. With feedback control like this, it is possible to maintain their own posture and to travel according to changes in the center of gravity and posture of a rider.

For example, traveling apparatuses that travel with a person riding thereon and have various vehicle body constitutions and vehicle structures to detect their own posture information and to perform drive control based on the detected posture information have been proposed. For example, Patent documents 1 and 2 disclose coaxial two-wheeled vehicles in which two wheels are coaxially arranged. Such coaxial two-wheeled vehicles have a characteristic that they are structurally unstable in a forward/backward direction, and that wheels are controlled by feedback from a posture sensor to stabilize the posture. Further, operations of the vehicle, such as traveling forward, traveling backward, and turning right and left, are performed by instructions by shifts of the center of gravity of the rider, instructions by inclinations of a step, instructions from a control stick, and the like. Alternatively, in some cases, remote control by externally-input reference-inputs, or autonomous movements based on trajectory planning by the vehicle itself are performed.

CITATION LIST

Patent Literature

Japanese Patent No. 3722493
Japanese Unexamined Patent Application Publication No. 2006-315666

SUMMARY OF INVENTION

Technical Problem

However, with regard to the turning control, there has been a possibility in the conventional simple control methods that the stability could be lost when, for example, a careless handling operation is performed during a turning movement.

The present invention has been made to solve such a problem, and an object thereof is to provide a coaxial two-wheeled vehicle capable of performing a turning movement with stability and its control method.

Solution to Problem

A coaxial two-wheeled vehicle in accordance with the present invention includes: drive means to drive two coaxially-arranged wheels; turning reference-input input means to input a turning reference input; and control means to control the drive means according to a turning gain based on a turning reference-input input by the turning reference-input input means to thereby perform a turning movement, in which the control means brings the turning gain to substantially zero when the coaxial two-wheeled vehicle is in a backward traveling state with a backward speed greater than or equal to a first speed, and sets the turning gain to a value greater than zero when a vehicle speed is substantially zero.

Note that the control means preferably changes the turning gain in a continuous manner in a backward traveling state between the first speed and a speed of zero.

Further, the control means preferably has a forward traveling mode and a backward traveling mode with regard to the turning gain. In the forward traveling mode, the control means preferably brings the turning gain to substantially zero when the coaxial two-wheeled vehicle is in a backward traveling state with the backward speed greater than or equal to the first speed, and sets the turning gain to a value greater than zero when the vehicle speed is substantially zero. In the backward traveling mode, assuming that the forward direction is positive and the backward direction is negative, the turning gain is preferably increased as the vehicle speed value increases, and set to substantially zero when the vehicle speed is substantially zero.

In a situation where the control means performs control in the forward traveling mode and the coaxial two-wheeled vehicle is moving backward, when the coaxial two-wheeled vehicle reaches a second speed lower than the first speed while being in a non-turning state, the control means preferably switches from the forward traveling mode to the backward traveling mode.

Further, in a situation where the control means performs control in the backward traveling mode and the coaxial two-wheeled vehicle is moving backward, when the coaxial two-wheeled vehicle reaches a third speed lower than the second speed while being in a non-turning state, the control means preferably switches from the backward traveling mode to the forward traveling mode.

Furthermore, in a situation where the control means performs control in the backward traveling mode and the coaxial two-wheeled vehicle is moving forward, when the coaxial two-wheeled vehicle reaches a fourth speed at which the turning gain coincides between the forward traveling mode and the backward traveling mode, the control means preferably switches from the backward traveling mode to the forward traveling mode.

A control method for a coaxial two-wheeled vehicle in accordance with the present invention is a control method for a coaxial two-wheeled vehicle to make the coaxial two-wheeled vehicle perform a turning movement by controlling the drive means according to a turning gain based on a turning reference-input input by the turning reference-input input means, in which the turning gain is brought to substantially zero when the coaxial two-wheeled vehicle is in a backward traveling state with a backward speed greater than or equal to a first speed, and the turning gain is set to a value greater than zero when a vehicle speed is substantially zero.

Note that the turning gain is preferably changed in a continuous manner in a backward traveling state between the first speed and a speed of zero.

Further, the turning gain preferably has a forward traveling mode and a backward traveling mode. In the forward traveling mode, the control means preferably brings the turning gain to substantially zero when the coaxial two-wheeled vehicle is in a backward traveling state with the backward speed greater than or equal to the first speed, and sets the turning gain to a value greater than zero when the vehicle speed is substantially zero. In the backward traveling mode, assuming that the forward direction is positive and the backward direction is negative, the turning gain is preferably increased as the vehicle speed value increases, and set to substantially zero when the vehicle speed is substantially zero.

In a situation where control is performed in the forward traveling mode and the vehicle is moving backward, when the vehicle reaches a second speed lower than the first speed while being in a non-turning state, the traveling mode is preferably switched from the forward traveling mode to the backward traveling mode.

Further, in a situation where control is performed in the backward traveling mode and the vehicle is moving backward, when the vehicle reaches a third speed lower than the second speed while being in a non-turning state, the traveling mode is preferably switched from the backward traveling mode to the forward traveling mode.

Furthermore, in a situation where control is performed in the backward traveling mode and the vehicle is moving backward, when the vehicle reaches a fourth speed at which the turning gain coincides between the forward traveling mode and the backward traveling mode, the traveling mode is preferably switched from the backward traveling mode to the forward traveling mode.

Further, an aspect of the present invention is a coaxial two-wheeled vehicle including: a step portion on which a rider rides; an operation lever portion that is connected to the step portion and used to operate the coaxial two-wheeled vehicle; a turning operation unit that is provided in the operation lever portion and used to operate a turning movement of the coaxial two-wheeled vehicle; and a control portion that performs turning control according to an operation signal output from the turning operation unit, in which when a turning movement is performed according to an operation signal from the turning operation unit while the coaxial two-wheeled vehicle is traveling, the control portion performs turning control so as to increase the turning radius.

Further, in this aspect, the control portion includes: a turning control unit that calculates a turning speed reference input value used to determine a wheel speed difference between two wheels based on an operation signal from the turning operation unit and a gain value; and a vehicle speed detection unit that detects a vehicle speed, and when the vehicle speed from the vehicle speed detection unit is greater than or equal to a first threshold, the turning control unit may decreases the gain value as the vehicle speed increases.

Furthermore, in this aspect, the turning control unit may decreases the gain value in inverse proportion to the vehicle speed from the vehicle speed detection unit.

Note that in this aspect, in addition to decreasing the gain value in proportion to the vehicle speed from the vehicle speed detection unit, the turning control unit may set the gain value to roughly zero when the vehicle speed becomes greater than or equal to a second threshold.

Further, in this aspect, when a turning movement is performed according to an operation signal from the turning operation unit while the coaxial two-wheeled vehicle is traveling, the control portion may lower the operation sensitivity to an operation signal from the turning operation unit.

Further, an aspect of the present invention may also be a control method for a coaxial two-wheeled vehicle, the coaxial two-wheeled vehicle including: a step portion on which a rider rides; an operation lever portion that is connected to the step portion and used to operate the coaxial two-wheeled vehicle; a turning operation unit that is provided in the operation lever portion and used to operate a turning movement of the coaxial two-wheeled vehicle; and a control portion that performs turning control according to an operation signal output from the turning operation unit, in which the control method for a coaxial two-wheeled vehicle includes a turning control step of, when a turning movement is performed according to an operation signal from the turning operation unit while the coaxial two-wheeled vehicle is traveling, increasing the turning radius.

Further, an aspect of the present invention is a coaxial two-wheeled vehicle including: a vehicle speed detection unit that detects a vehicle speed; and a turning control unit that performs turning control so as to increase a turning radius as the vehicle speed detected by the vehicle speed detection unit increases, in which the coaxial two-wheeled vehicle moves with a rider riding thereon, and if the turning control unit determines that a brake control action is initiated during a turning movement, the turning control unit performs turning control so as to suppress the decrease of the turning radius.

Further, in this aspect, if the turning control unit determines that a brake control action is initiated during a turning movement, it may decrease a turning speed reference input value used to determine a wheel speed difference between two wheels as time elapses.

Furthermore, in this aspect, the turning control unit decreases the turning speed reference input value by decreasing the gain value, and therefore may perform setting such that the gain value becomes zero when the vehicle speed becomes zero.

Note that in this aspect, if the turning control unit determines that a brake control action is initiated during a turning movement, it may decrease a turning speed reference input value used to determine a wheel speed difference between two wheels as the vehicle speed detected by the vehicle speed detection unit lowers.

Further, if the turning control unit determines that a brake control action is initiated during a turning movement, the turning control unit may (a) decrease a turning speed reference input value used to determine a wheel speed difference between two wheels as time elapses when the vehicle speed from the vehicle speed detection unit is less than a predetermined value, and (b) decrease the turning speed reference input value as the vehicle speed decreases when the vehicle speed from the vehicle speed detection unit is greater than or equal to the predetermined value.

Furthermore, in this aspect, the coaxial two-wheeled vehicle may further include: a step portion on which a rider rides; an operation lever portion that is connected to the step portion and used to operate the coaxial two-wheeled vehicle; and a turning operation unit that is provided in the operation lever portion and used to operate a turning movement of the coaxial two-wheeled vehicle.

Note that in this aspect, if the turning control unit determines that a brake control action is initiated during a turning movement, it may suppress the decrease of the turning radius by lowering the operation sensitivity to an operation signal from the operation lever portion or the turning operation unit.

Further, in this aspect, the coaxial two-wheeled vehicle may further include: a posture sensor that detects a posture value of the coaxial two-wheeled vehicle; a control unit that calculates a posture speed reference input value based on the posture value detected by the posture sensor; and a wheel drive unit that rotationally drives a wheel based on a wheel speed reference input value calculated from the posture speed reference input value from the control unit and the turning speed reference input value from the turning control unit.

Further, an aspect of the present invention may also be a control method for a coaxial two-wheeled vehicle including: a vehicle speed detection step of detecting a vehicle speed; and a turning control step of performing turning control so as to increase a turning radius as the vehicle speed detected in the vehicle speed detection step increases, in which the coaxial two-wheeled vehicle moves with a rider riding thereon, and in the turning control step, if it is determined that a brake control action is initiated during a turning movement, turning control to suppress the decrease of the turning radius is performed. In this aspect, the safety of a coaxial two-wheeled vehicle can be improved.

Advantageous Effects of Invention

In accordance with the present invention, a coaxial two-wheeled vehicle capable of performing a turning movement with stability and its control method can be provided.

DESCRIPTION OF EMBODIMENTS

First Exemplary Embodiment of the Invention

Figure 1:
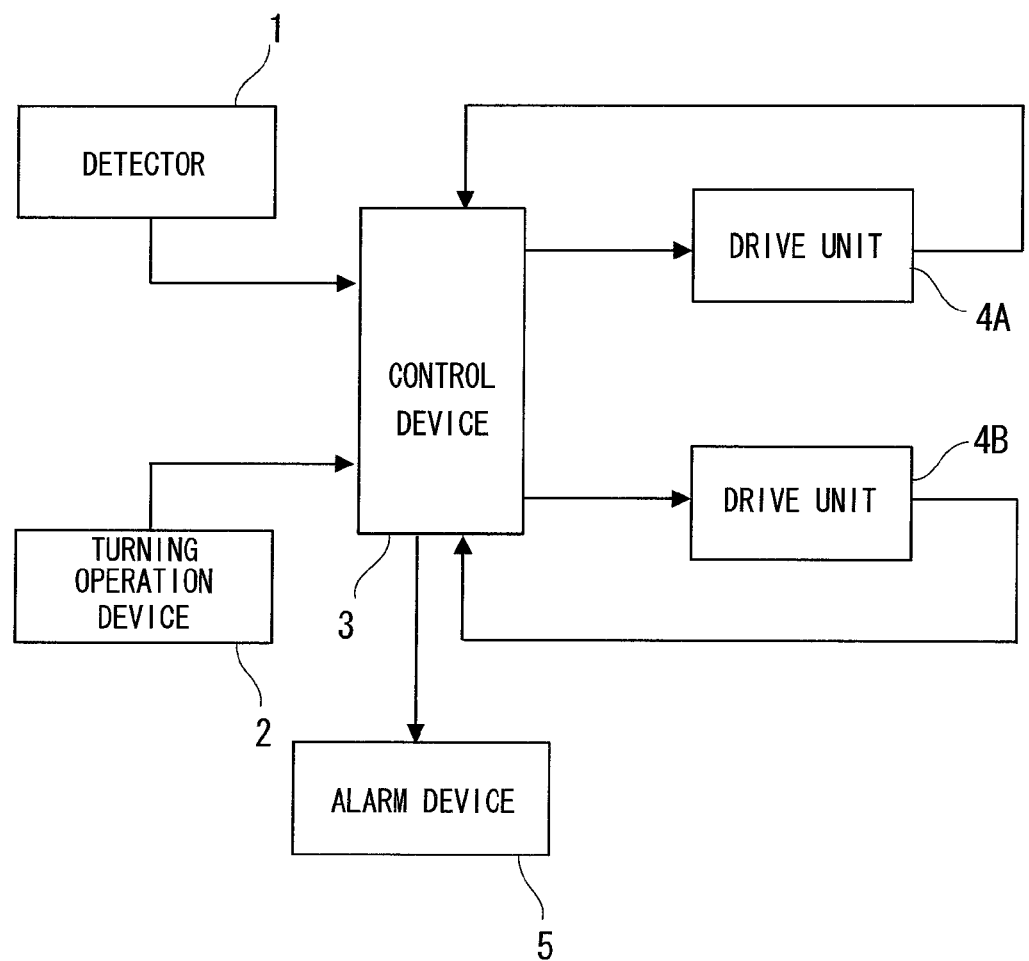
FIG. 1 is a control block diagram showing a configuration of vehicle control for a coaxial two-wheeled vehicle in accordance with an exemplary embodiment of the present invention.

FIG. 1 is a block diagram showing a configuration of vehicle control for a coaxial two-wheeled vehicle in accordance with a first exemplary embodiment. A detector 1 detects posture information of the vehicle such as a vehicle pitch angle (posture angle), a vehicle pitch angular speed (posture angular speed), a vehicle position, and a vehicle speed.

A turning operation device 2 generates a turning angle reference input and a turning angular speed reference input of the vehicle. The turning operation device 2 receives, for example, an operation of a handle by a rider, an operation of a turning handle by a rider, and the like, and generates a turning angle reference input and a turning angular speed reference input according to these operation amounts. Further, as for the turning operation device 2, a technique to input a turning reference input according to a roll angle of a vehicle inclined by the shift of the center of gravity of a rider, which has been previously proposed by the applicant of the present application (refer to the above-mentioned Patent document 1), may be applied. Note that the following explanation is made with an assumption that the turning angle reference input and the turning angular speed reference input are a yaw angle reference input and a yaw angular speed reference input respectively.

A control device 3 performs control so that the vehicle tracks the target values, i.e., the vehicle pitch angle reference input, the vehicle pitch angular speed reference input, the vehicle position reference input, and the vehicle speed reference input with stability. That is, the control device 3 calculates a drive torque(s) necessary to stabilize the whole system so as not to tumble down, based on these target values and information input from a detection device 5 and a turning operation device 6, and drives the motor of each of drive units 4A and 4B. The wheel angles and the wheel angular speeds of the wheels resulting from the rotations of the motors of the respective drive units 4A and 4B are fed back to the control device 3. With the configuration of vehicle control like this, the coaxial two-wheeled vehicle 10 travels forward/backward by the rider shifting the center of gravity forward/backward, and turns left/right by the rider operating the turning operation device 2.

An alarm device 5 is a means to notify the rider that the traveling mode is switched from a forward traveling mode to a backward traveling mode with a sound and/or a light. This alarm device 5 is composed of sound output means such as a speaker and light output means such as an LED device.

Figure 2:
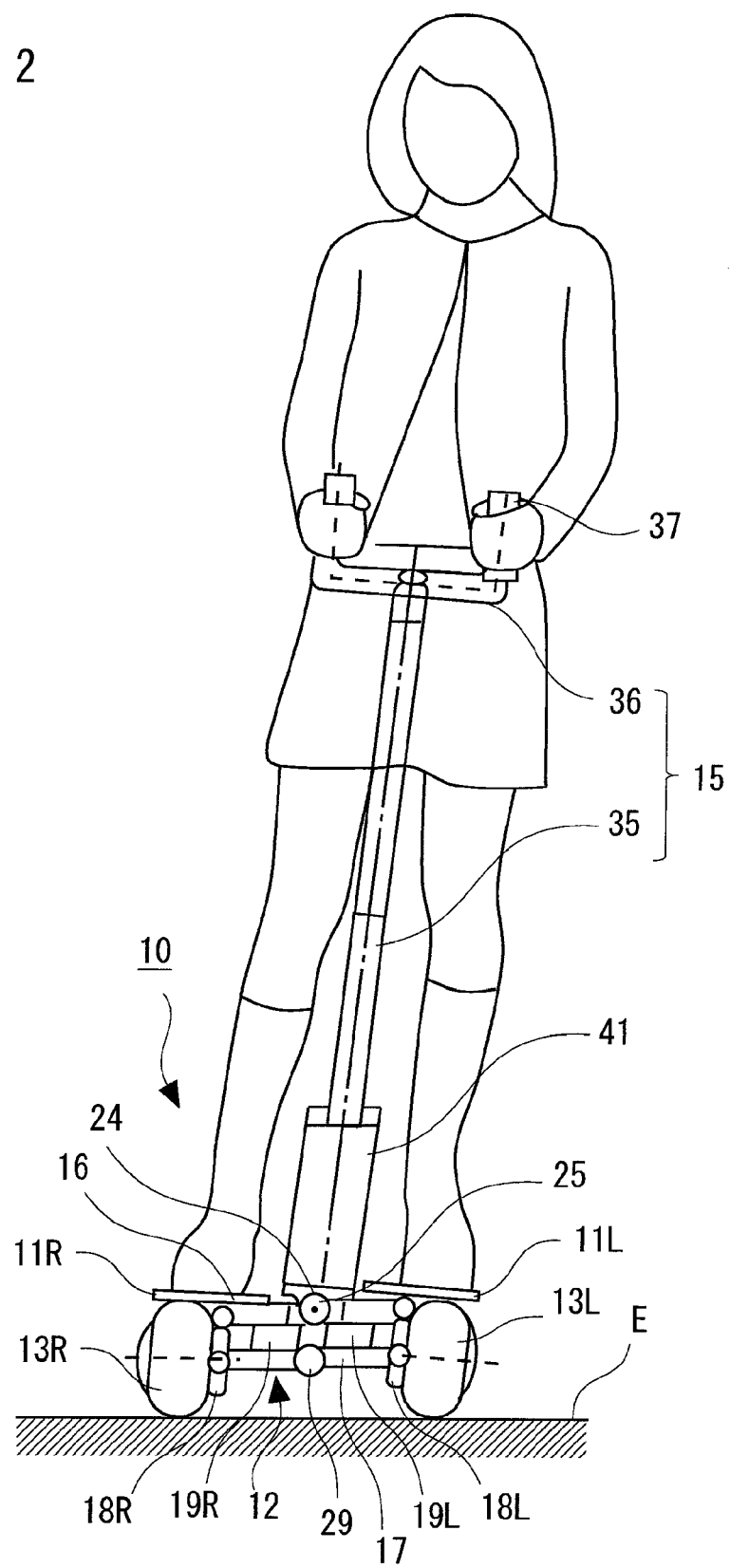
FIG. 2 is a figure for explaining an aspect where a rider rides on and performs a turning movement with a coaxial two-wheeled vehicle in accordance with an exemplary embodiment of the present invention.

FIG. 2 shows an aspect where a rider rides on and performs a turning movement with a coaxial two-wheeled vehicle in accordance with a first exemplary embodiment of the present invention.

The coaxial two-wheeled vehicle 10 includes divided steps 11L and 11R, a vehicle main body 12, wheels 13L and 13R, wheel drive units 14L and 14R, a handle 15, and the like. The two divided steps 11L and 11R are an example of a step plate on which a driver rides. The vehicle main body 12 supports the divided steps 11L and 11R such that their posture can be changed in the roll direction X. A pair of wheels 13L and 13R are rotatably supported in the vehicle main body 12. The wheel drive units 14L and 14R are a specific example of wheel drive means to rotationally drive the wheels 13L and 13R. The handle 15 is an operation lever to indirectly change the posture of the divided steps 11L and 11R through the vehicle main body 12.

The divided steps 11L and 11R are used by a driver to put each of his/her feet thereon to ride on the coaxial two-wheeled vehicle, and are composed of a pair of flat plate bodies each of which is formed with a size substantially equal to or slightly larger than a human foot. The vehicle main body 12 is constructed as a parallel link mechanism including a vehicle body upper member 16 and a vehicle body lower member 17 that are arranged above and below and in parallel to each other, and a pair of side members 18L and 18R that are arranged left and right of and in parallel to each other and rotatably coupled to the vehicle body upper member 16 and the vehicle body lower member 17. A pair of coil springs 19L and 19R are interposed between the vehicle body upper member 16 and vehicle body lower member 17 having this parallel link mechanism. The coil springs 19L and 19R exert spring forces such that angles formed by the vehicle body upper member 16 and the vehicle body lower member 17 and the pair of side members 18L and 18R are respectively maintained at right angles.

Wheel drive units 14L and 14R are respectively attached on the respective outer surfaces of the pair of side members 18L and 18R. The wheel drive units 14L and 14R are constructed, for example, from an electric motor and a series of reduction gears that are coupled to the rotation shaft of the electric motor so that the power can be transmitted therethrough, and the like. Each of the wheel drive units 14L and 14R is composed of a fixed portion fixed to the respective one of the side members 18L and 18R, and a rotatable portion that is rotatably supported on the fixed portion. Further, a pair of wheels 13L and 13R are mounted to the respective fixed portions. The centers of rotation of the pair of wheels 13L and 13R, which are supported on the pair of side members 18L and 18R through the pair of wheel drive units 14L and 14R in this manner, are mutually aligned on the same axial centerline when the vehicle is placed on a flat road surface.

Further, an operation lever bracket 24 is mounted in the central portion in the left/right direction of the vehicle body upper member 16 and vehicle body lower member 17. The axial tip portion of the upper front rotation support shaft 25 fits in a hole provided in the front of the vehicle body upper member 16, and is clamped and fixed by a setscrew 7 passing through the front of the vehicle body upper member 16. A lower front rotation support shaft 29 is rotatably fitted in the lower central bearing hole in the front portion of the operation lever bracket 24. The operation lever bracket 24 is rotated in the roll direction X by using this lower front rotation support shaft 29 as the rotation center. Further, in order to detect the operation amount (rotation amount) of the handle 15 through the rotation amount (rotation angle) of the operation lever bracket 24 in the roll direction X, an angle detection sensor that detects the inclination angle of the operation lever bracket 24 is attached to the upper front rotation support shaft 25.

The lower end portion of the handle 15 is fixed in the fitting portion of the operation lever bracket 24. The handle 15 is composed of a handle post 35 that is fitted with and fixed to the fitting portion, and a handle lever 36 that is provided on the upper end portion of this handle post 35. Further, a turning operation ring 37 capable of controlling the driving of the pair of wheel drive units 14L and 14R is attached on the upper end portion of one of protruding portions of the handle lever 36. The turning operation ring 37, which is used to control a turning movement of the vehicle by a manual operation, serves as an accelerator ring for a turning movement. By rotating this turning operation ring 37 to a desired direction to which the driver wants to turn, a signal according to its operation amount is output to a control device (which is described later). In this way, the control portion controls the driving of the pair of wheel drive units 14L and 14R according to an operation amount of the turning operation ring 37, and thereby produces a rotation difference between the left and right wheels 13L and 13R so that the vehicle can perform turning traveling at a desired speed. Note that the ratio of a turning reference input value output supplied to the control device to a turning input supplied from turning movement input means such as a turning operation ring 37 and a turning lever is referred to as "turning gain".

When a rider riding on the coaxial two-wheeled vehicle 10 tilts the handle 15, a difference is produced between torque reference inputs or speed reference inputs provided to the left and right motors 18L and 18R, so that a turning movement can be performed. For example, the handle 15 is tilted to the left with respect to the rider, a negative turning correction value is added to the reference input value for the motor 18L and a positive turning correction value is added to the reference input value for the motor 18R. As a result, the right tire 13R moves forward relative to the left tire 13L, and the vehicle and the rider thereby turn left, i.e., in the counterclockwise direction as viewed from the top. At this point, if the vehicle is traveling forward, the centrifugal force produced toward the outer side of the turning, i.e., to the right is balanced with the force that is produced as the rider tries to lean to the left, i.e., toward the inner side of the turning, so that the turning traveling can be continued in a balanced manner.

However, if the vehicle is traveling backward, the left tire 13L moves backward relative to the right tire 13R, and the vehicle thereby turns in the counterclockwise direction as viewed from the top. The centrifugal force is produced toward the outer side of the turning, i.e., to the left, and therefore keeping the balance becomes impossible. Depending on the speed, the vehicle could tumble down toward the outer side of the turning.

The reason for this is explained with reference to a graph shown in FIG. 3. In the graph shown in FIG. 3, the vertical axis and horizontal axis represent turning gains and vehicle speeds respectively.

Figure 3:
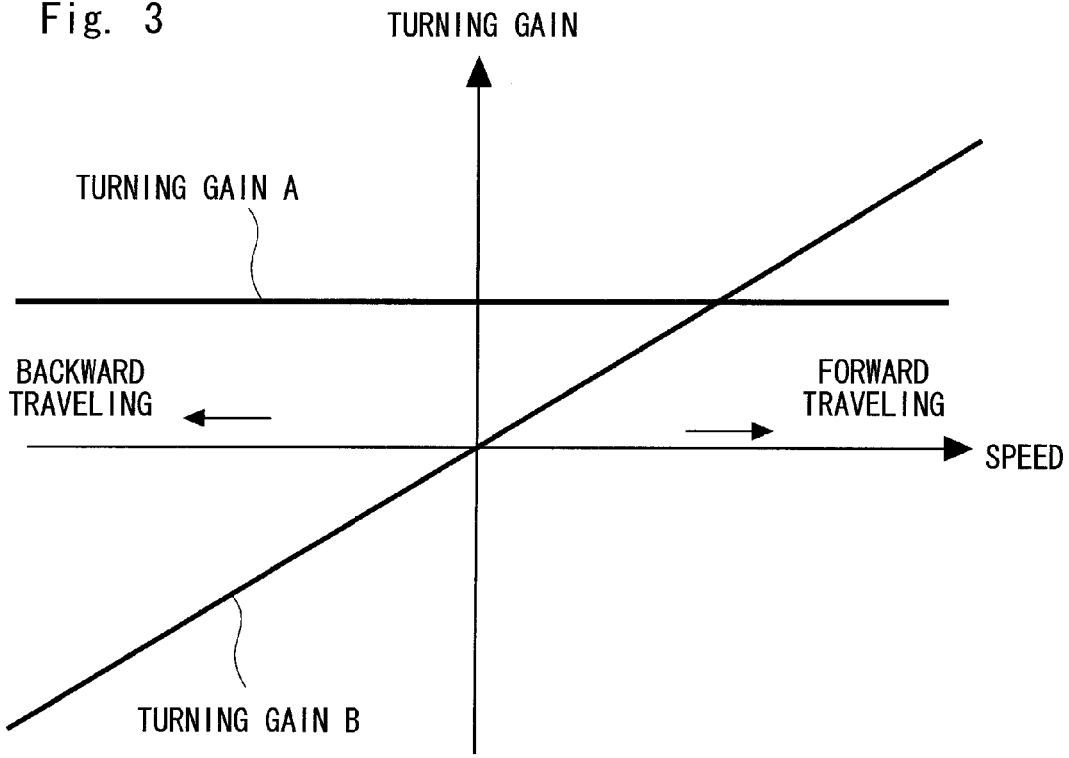
FIG. 3 is a graph for explaining a general turning gain.

In the graph shown in FIG. 3, the first and third quadrants are safety regions where the inclination of the rider is balanced with the centrifugal force, but the second and fourth quadrants are dangerous regions where they are not balanced with each other. Note that the turning gain A takes on a constant value regardless of the change in speed. Therefore, when the speed is negative, i.e., when the vehicle is a backward traveling state, it falls within the second quadrant and the inclination of the rider is not balanced with the centrifugal force.

Therefore, to avoid falling within the second quadrant, i.e., within the dangerous region, it is conceivable to make the turning gain proportional to the speed as shown as the turning gain B. In the case where the turning gain B is adopted, it is safe because it does not fall within either of the second and fourth quadrants even if the speed is changed. However, turning cannot be performed when the speed is zero. That is, if the turning gain B is adopted, the coaxial two-wheeled vehicle cannot perform on-the-spot turning, and thus impairing the usability. Further, if the line of the turning gain is discontinuous, it poses problems in terms of stability. For example, the tuning direction changes suddenly at a certain speed.

Figure 4:
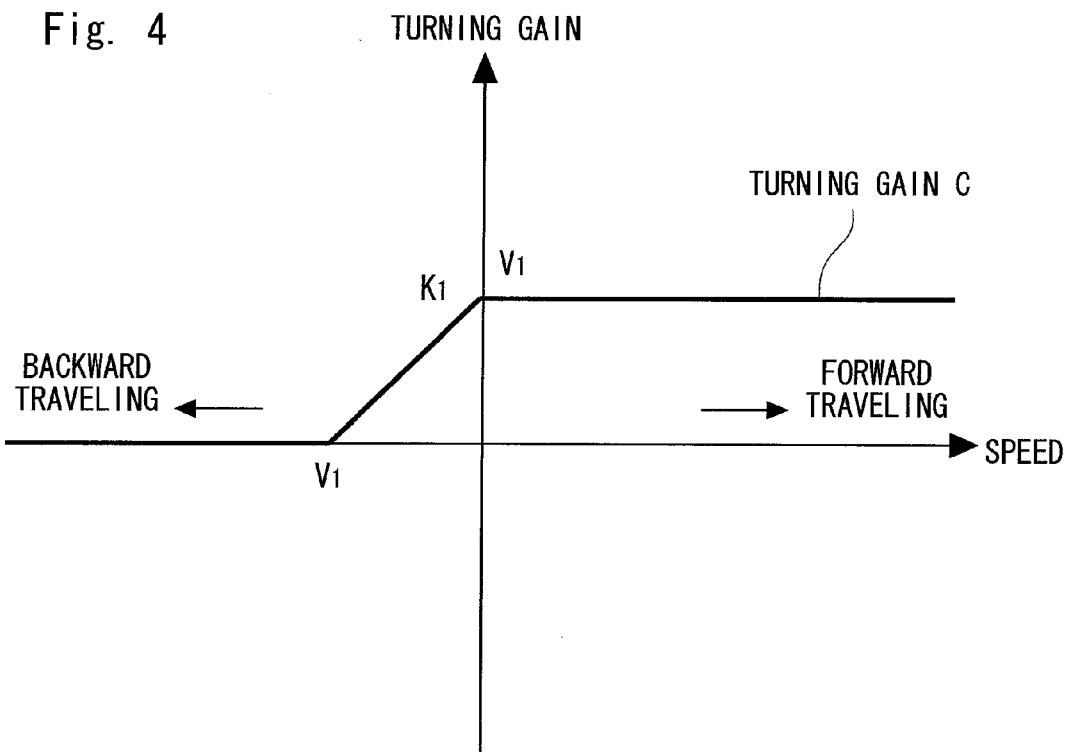
FIG. 4 is a graph for explaining a turning gain in controlling a coaxial two-wheeled vehicle in accordance with an exemplary embodiment of the present invention.

A graph shown in FIG. 4 shows turning gains in a coaxial two-wheeled vehicle in accordance with the first exemplary embodiment. When the vehicle is in a forward traveling state with a speed greater or equal to zero, the turning gain is a positive constant value K1. Further, when the speed is less than or equal to V2 (V2 is a predetermined negative value), the turning gain is zero. Furthermore, when the speed is between 0 and V2, the turning gain is set so as to continuously change in simple proportion or according to a quadratic expression (gradually increase in this example).

By setting the turning gain in this manner, when the vehicle is in a backward traveling state with a speed less than or equal to V2, the vehicle does not perform a turning movement even if the turning lever is tilted because the turning gain is substantially zero. Therefore, no centrifugal force is produced and the risk of tumbling down can be thereby avoided. Meanwhile, if the turning lever is tilted when the speed is zero, on-the-spot turning can be performed because the turning gain is a positive value K1. Further, while the turning movement is continued, if the vehicle travels backward at that state and the backward speed increases, the turning gain decreases according to the increase in speed and gets closer to zero. Therefore, the turning movement is gradually reduced and stopped.

As has been explained above, in accordance with a control method for a coaxial two-wheeled vehicle in accordance with the first exemplary embodiment, it provides such an advantageous effect that the problem such as tumbling down during a turning movement while the vehicle is traveling backward can be avoided without losing the function of performing on-the-spot turning. Specifically, in the first exemplary embodiment, the turning gain is gradually decreased when the speed is less than or equal to zero, and the turning movement is prohibited when the vehicle moves in the backward direction at a speed greater than or equal to a predetermined speed. By doing so, the centrifugal force is prevented from being produced, and tumbling down can be thereby prevented. A rider can perform stable turning traveling at a relatively slow speed in which the centrifugal force is balanced by tilting toward the inner side of the turning even when the vehicle is traveling backward. In this example, by setting the turning gain at the time when the vehicle speed is zero to a value greater than zero, the on-the-spot turning can become possible.

Second Exemplary Embodiment of the Invention

In turning control in a coaxial two-wheeled vehicle in accordance with a second exemplary embodiment, two systems of relational expressions of turning reference-input outputs corresponding to turning reference-input inputs, i.e., one for the forward traveling mode and the other for the backward traveling mode are prepared, and the traveling mode is automatically switched while a rider is riding on the vehicle.

Figure 5:
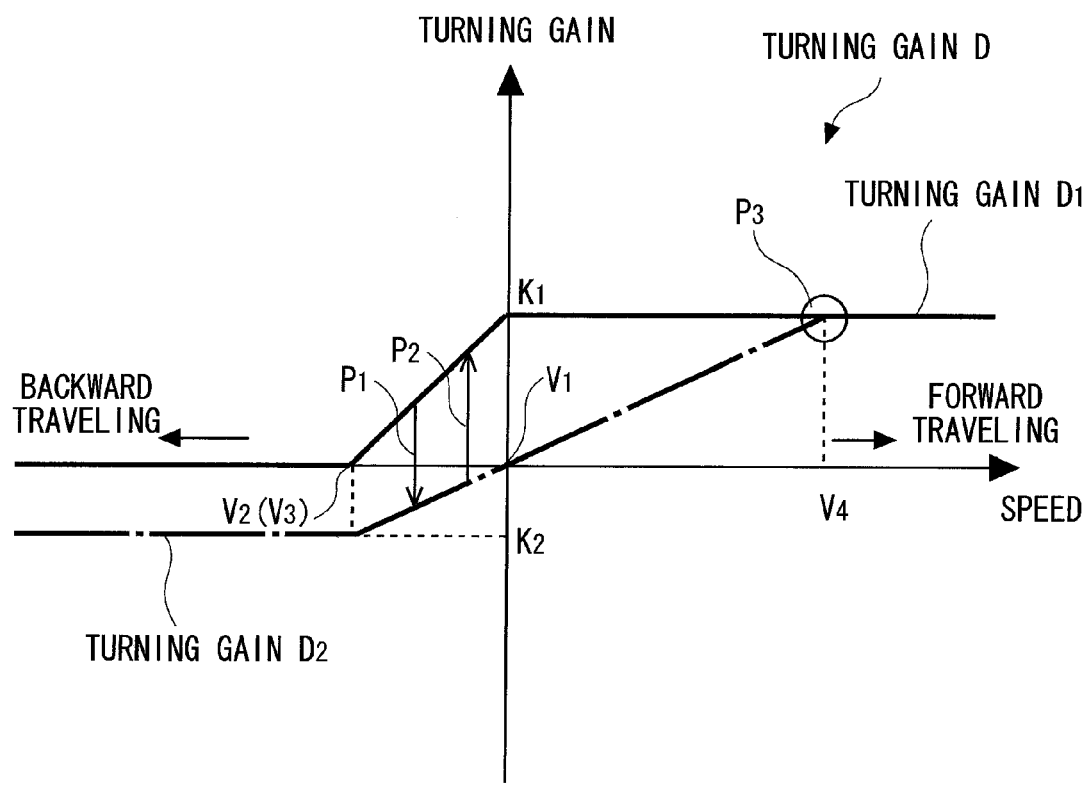
FIG. 5 is a graph for explaining a turning gain in controlling a coaxial two-wheeled vehicle in accordance with an exemplary embodiment of the present invention.

Turning control in a coaxial two-wheeled vehicle in accordance with a second exemplary embodiment is explained in a concrete manner with reference to the drawings. FIG. 5 is a graph showing a turning gain used in this turning control. This turning gain D has two profiles, i.e., is composed of a turning gain D1 for the forward traveling mode profile indicated by a solid line and a turning gain D2 for the backward traveling mode profile indicated by a dotted line. The turning gain D1 for the forward traveling mode indicated by the solid line is the same as the turning gain used in the turning control in accordance with the first exemplary embodiment of the present invention.

The turning gain D2 for the backward traveling mode indicated by the dashed dotted line is established based on a similar concept to that of the first exemplary embodiment. Specifically, when the speed is smaller than a negative value V3 (i.e., the backward speed is greater, thus faster than V3), the turning gain D2 is set to a constant negative value K2. Further, in the region greater than V3, the turning gain increases in direct proportion to the increase in speed. When the vehicle speed is zero, the turning gain D2 is zero. At a positive value V4 (e.g., 5.0km/h in the forward direction), the turning gain D2, which has increased in direct proportion to the increase in speed, becomes K1. That is, the turning gain D2 takes on the same value as that of the turning gain D1 for the forward traveling mode.

However, the forward traveling mode and the backward traveling mode are discontinuous. Therefore, the turning control in accordance with this exemplary embodiment uses an algorithm shown in FIG. 6 to perform the mode switching in such a manner that a rider does not feel the discontinuity.

Figure 6:
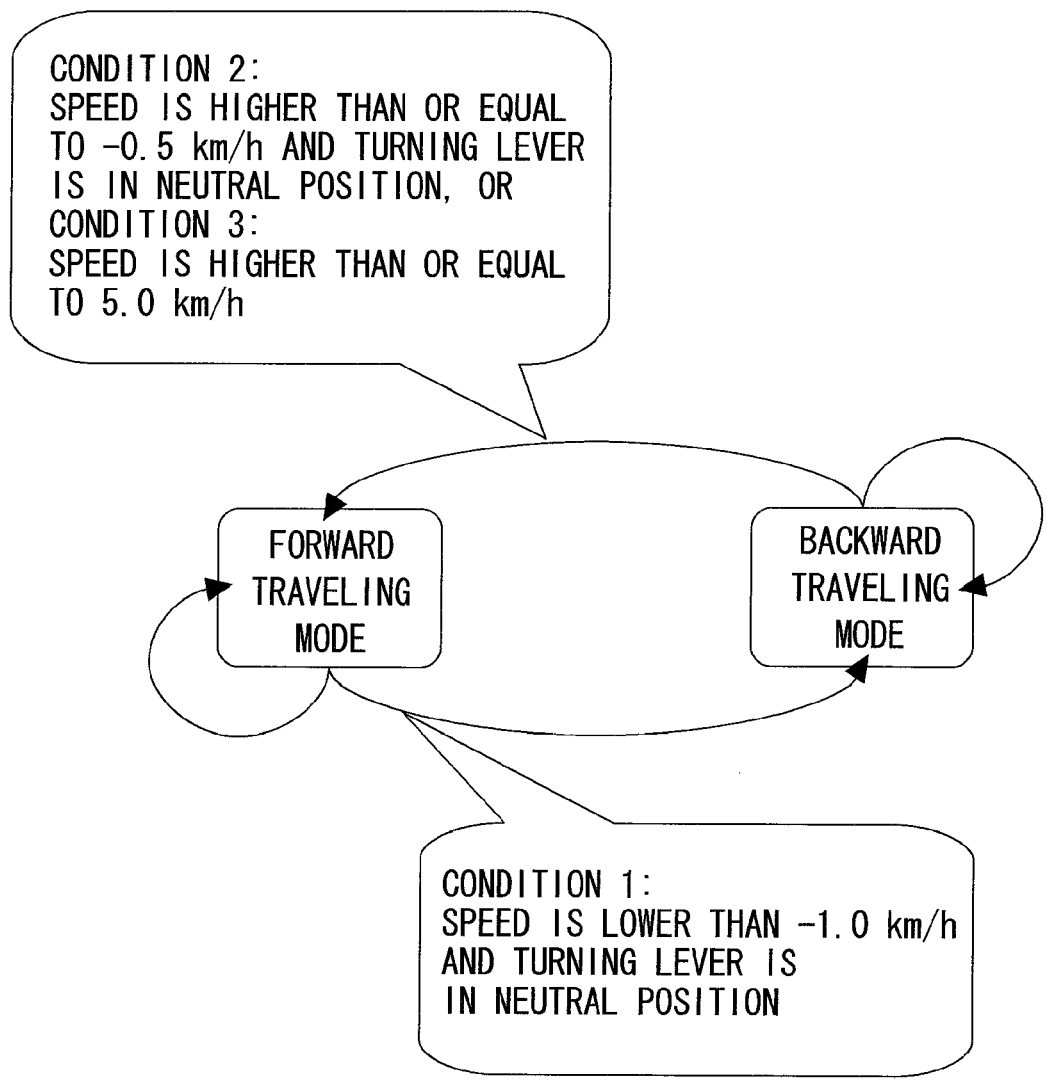
FIG. 6 is a state transition diagram showing a control algorithm of a coaxial two-wheeled vehicle in accordance with an exemplary embodiment of the present invention.

The switching point P1 of the turning gain D shown in FIG. 5 corresponds to switching from a forward traveling mode to a backward traveling mode, and corresponds to a condition 1 in the algorithm shown in FIG. 6. The condition 1 specifies that the speed is greater than or equal to −0.5 km/h (i.e., moving backward with a speed greater than or equal to 0.5 km/h) and the turning lever 15 is in the neutral position. Specifically, in a forward traveling mode, when the vehicle moves several tens of centimeters directly backward, the traveling mode is automatically switched to a backward traveling mode. At this point, if the mode switching is performed in a state where the turning lever 15 is tilted either to the left or to the right, the tuning becomes discontinuous. Therefore, the condition that turning is not performed, i.e., the turning lever 15 is in the neutral potion is included.

At this point, the rider may be notified that the traveling mode is changed from the forward traveling mode to the backward traveling mode by the alarm device 5 with a sound and/or a light. Specifically, sound output means such as a speaker and/or light output means such as an LED device may be provided in a part of the coaxial two-wheeled vehicle, and the control device 3 may use the switching from the forward traveling mode to the backward traveling mode as a trigger and instruct these sound output means and/or light output means to output a sound and/or a light. The sound output means and/or light output means output a sound and/or a light in response to this instruction.

If the backward traveling is continued in a state where the turning lever 15 is tilted either to the left or to the right in the forward traveling mode, the traveling mode is not changed to the backward traveling mode. Therefore, since the vehicle is kept in the forward traveling mode, the turning is stopped. At this point, if the rider returns the handle to the neutral, the mode switching from the forward traveling mode to the backward traveling mode occurs.

The switching from the backward traveling mode to the forward traveling mode occurs at the point P1 and point P2 of the turning gain D. For example, the vehicle speed is −1.0 km/h at the point P1, and is −0.5 km/h at the point P2. The switching at the point P1 occurs when the condition 2 of the algorithm shown in FIG. 6 is satisfied. The condition 2 specifies that the vehicle speed is greater than or equal to −0.5 km/h (i.e., moving backward with a speed greater than or equal to 0.5 km/h) and the turning lever 15 is in the neutral position as shown in FIG. 6.

Note that in order to prevent frequent switching between the forward traveling mode and the backward traveling mode, the speeds at the point P1 and the point P2 are preferably different. That is, hysteresis is preferably incorporated into the switching conditions by providing a difference greater than or equal to a predetermined value between these speeds.

The other switching point P3 is a point at which the turning gain coincides between the forward traveling mode and the backward traveling mode. That is, the switching point P3 is a point at which the traveling mode is switched when the forward speed increases in the backward traveling mode and the turning gain D2 thereby increases with the increase in the forward speed and has reached K1. In this case, even when the turning lever 15 is not in the neutral position and tilted either to the left or to the right and the vehicle is thereby performing a turning movement, the mode is switched from the forward traveling mode to the backward traveling mode as in the case where the turning lever 15 is in the neutral position.

Note that in the above described example, the conditions for switching the mode between the forward traveling mode and the backward traveling mode are determined by both the vehicle speed and the presence/absence of a turning reference-input input. However, it is not limited to such conditions, and the determination may be made based on the vehicle speed alone.

As has been explained above, in accordance with a control method for a coaxial two-wheeled vehicle in accordance with the second exemplary embodiment, it provides such an advantageous effect that the problem such as tumbling down in a turning movement while the vehicle is traveling backward can be avoided without losing the function of performing the on-the-spot turning. In this exemplary embodiment, the contradiction between directions of the tuning and the centrifugal force, in particular, in the forward traveling state, standstill state, and backward traveling state is resolved, and stable turning traveling can be thereby achieved in any speed region.

Third Exemplary Embodiment of the Invention

Figure 7:
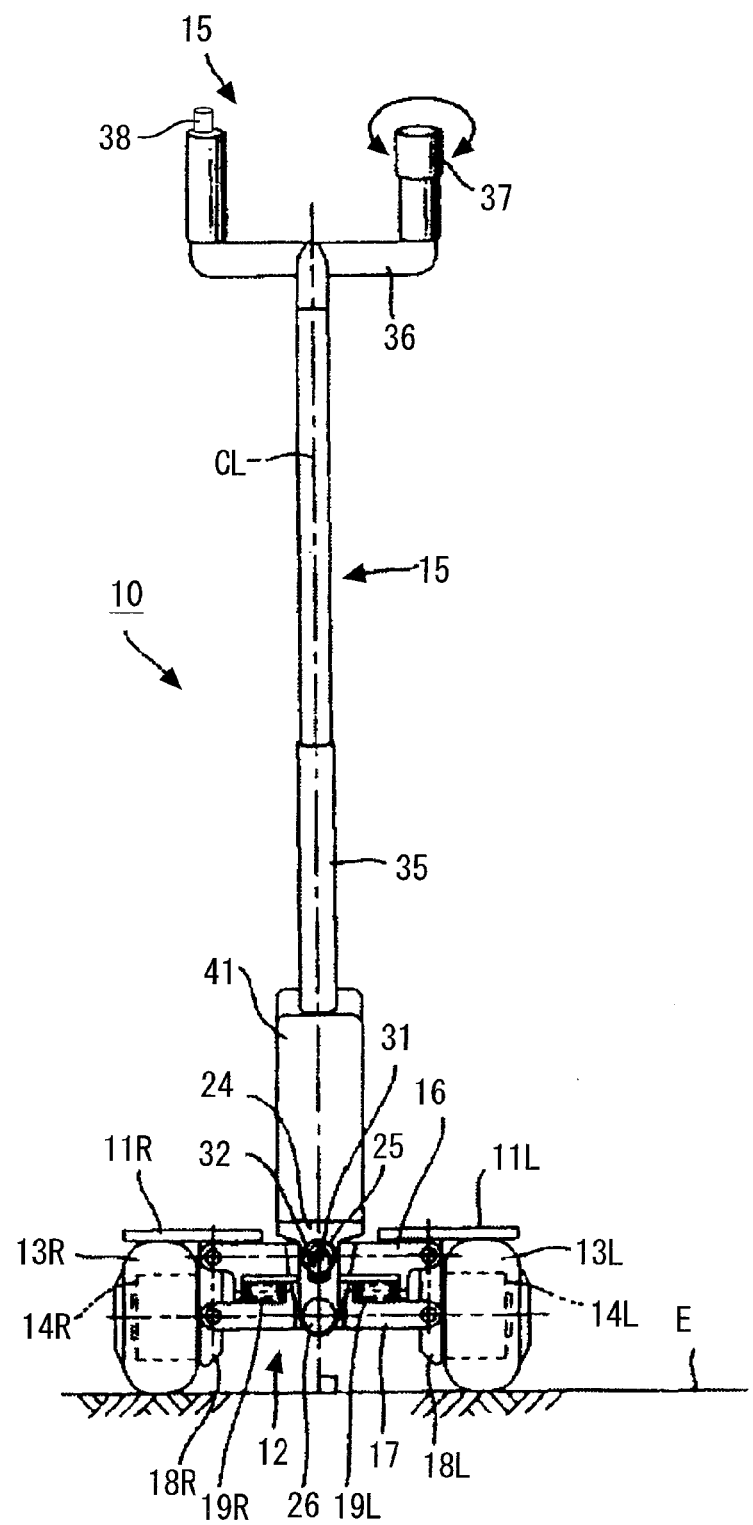
FIG. 7 is a front view showing a structure of a coaxial two-wheeled vehicle in accordance with an exemplary embodiment of the present invention.
Figure 8:
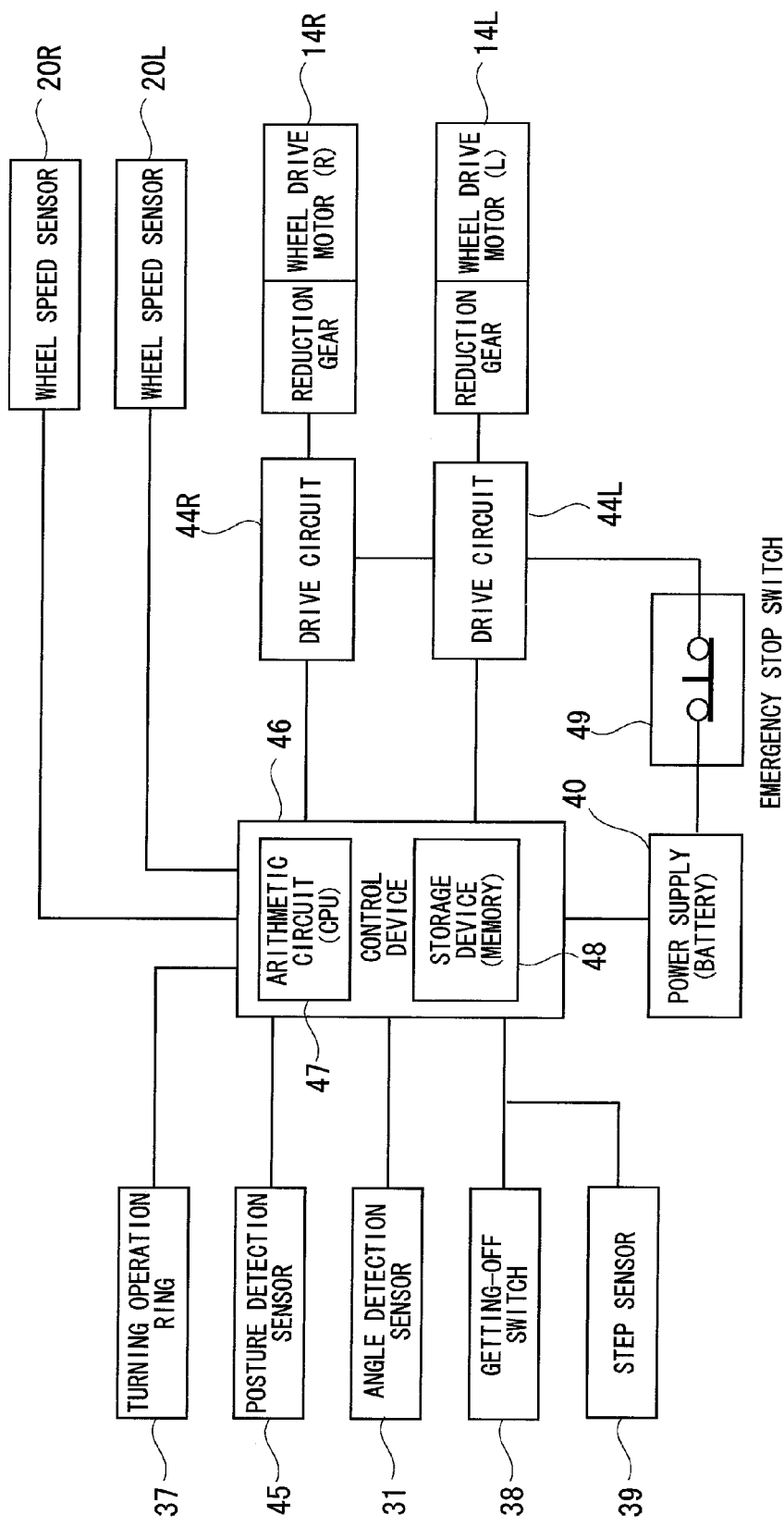
FIG. 8 is a block diagram showing an example of a system configuration of a coaxial two-wheeled vehicle in accordance with an exemplary embodiment of the present invention.

FIG. 7 is a front view showing a structure of a coaxial two-wheeled vehicle in accordance with third to fifth exemplary embodiments. Further, FIG. 8 is a block diagram showing an example of a system configuration of a coaxial two-wheeled vehicle in accordance with a third exemplary embodiment. Note that in the specification of the present application, the pitch axis is an axis corresponding to the axle of the pair of wheels 13L and 13R. Further, the roll axis is an axis that passes through the center of the vehicle main body 12 and is in parallel with the traveling direction of the coaxial two-wheeled vehicle 10. Furthermore, the yaw axis is an axis that passes through the center of the vehicle main body 12 and is perpendicular to the road surface E on which the coaxial two-wheeled vehicle 10 travels. A coaxial two-wheeled vehicle 10 in accordance with this exemplary embodiment includes a vehicle main body 12, wheels 13L and 13R, wheel drive units 14L and 14R, an operation lever 15, a turning operation ring 37, and a control device 46.

The operation lever 15 is an operation portion. By tilting this in the forward/backward direction, the coaxial two-wheeled vehicle 10 performs forward traveling or backward traveling. Further, by tilting this in the roll direction, the coaxial two-wheeled vehicle 10 performs a turning operation.

The operation lever 15 is fixed to an operation lever bracket 24 at its end portion. Further, the operation lever 15 is composed of a handle post 35 and a handle lever 36 provided on the upper end portion of the handle post 35.

A turning operation ring (turning operation portion) 37 capable of controlling the driving of the pair of wheel drive units 14L and 14R is attached on the upper end portion of one of protruding portions of the handle lever 36. The turning operation ring 37 includes a position detection unit, such as a potentiometer, embedded therein. When the turning operation ring 37 is rotationally operated to a desired direction to which the rider wants to turn by the rider, the position detection unit detects its operation amount and operation direction. Further, the turning operation ring 37 outputs an operation signal according to the operation amount and operation direction detected by the position detection unit to the control device 46.

The control device 46 controls the driving of the pair of wheel drive units 14L and 14R according to the operation signal from the turning operation ring 37, and thereby produces a rotation difference between the left and right wheels 13L and 13R. In this way, the coaxial two-wheeled vehicle 10 can perform turning traveling in a desired direction at a desired vehicle speed.

Wheel speed sensors 20L and 20R that detect the wheel speeds of the respective wheels 13L and 13R are provided in the left and right wheels 13L and 13R respectively. The wheel speed sensors 20L and 20R output the detected wheel speeds of the respective wheels 13L and 13R to the control device 46.

A getting-off switch 38 is provided on the upper end portion of the other protruding portion of the handle lever 36. The getting-off switch 38 is a switch that generates a getting-off assist start trigger signal. The getting-off assist start trigger signal is used as a trigger to perform getting-off assist control. When the rider pushes down the getting-off switch 38, a getting-off assist start trigger signal is supplied to the control device 46. The control device 46 starts to perform getting-off assist control in response to the getting-off assist start trigger signal.

The vehicle main body 12 supports the operation lever 15 such that the operation lever 15 can rotate in the roll direction. The pair of wheels 13L and 13R are coaxially arranged on both sides of the vehicle main body 12 in the direction perpendicular to the traveling direction, and rotatably supported in the vehicle main body 12. Two step portions 11L and 11R are provided on both the left and right sides of the operation lever 15 on the top surface of the vehicle main body 12.

Step sensors 39L and 39R are provided in the respective step portions 11L and 11R. Each of the step sensors 39L and 39R is composed of, for example, a weight sensor. Further, each of the step sensors 39L and 39R detects whether or not a foot of a rider is placed on the respective one of the step portions 11L and 11R, and if a foot is placed, it supplies a foot measurement signal to the control device 46.

The vehicle main body 12 is constructed as a parallel link mechanism including a vehicle body upper member 16 and a vehicle body lower member 17 that are arranged above and below and in parallel to each other, and a pair of side members 18L and 18R that rotatably coupled to the vehicle body upper member 16 and the vehicle body lower member 17. A pair of coil springs 19L and 19R are interposed between the vehicle body upper member 16 and vehicle body lower member 17 having this parallel link mechanism. The coil springs 19L and 19R exert spring forces such that angles formed by the vehicle body upper member 16 and the vehicle body lower member 17 and the pair of side members 18L and 18R are respectively maintained at right angles.

Wheel drive units 14L and 14R are respectively attached on the respective outer surfaces of the pair of side members 18L and 18R. The wheel drive units 14L and 14R are wheel drive means that rotationally drives the pair of wheels 13L and 13R independently. Each of the wheel drive units 14L and 14R is constructed, for example, from a wheel drive motor and a reduction gear that is coupled to the rotation shaft of the wheel drive motor so that the power can be transmitted therethrough.

An angle detection sensor 31 to detect an operation amount (rotation amount) of the operation lever 15 is attached to the rotation support shaft 25 of the vehicle main body 12. For example, a potentiometer, a sensor having a variable-condenser structure, or the like can be used as the angle detection sensor 31.

A battery 40, which is a specific example of a power supply 40 that supplies electrical power to the pair of wheel drive units 14L and 14R, the control device 46, and other electronic devices, electrical devices, and the likes, is provided on the top surface of the operation lever bracket 24, which also serves as the base portion of the operation lever 15. The battery 40 is covered by a power-supply cover 41.

Drive circuits 44L and 44R that drive the pair of wheel drive units 14L and 14R are embedded in the housing portion of the vehicle body upper member 16. Further, a posture sensor unit 45 that serves as posture detection means to detect postures of the vehicle main body 12, the operation lever 15, and the like and output their measurement signals, and a control device 46 that outputs a control signal used to perform drive control for the pair of wheel drive units 14L and 14R are provided in the vehicle body lower member 17.

The control device 46 performs predetermined arithmetic processing based on an operation signal from the turning operation ring 37, a measurement signal from the posture sensor unit 45, a measurement signal from the angle detection sensor 31, a getting-off assist start trigger signal from the getting-off switch 38, a foot measurement signal from the step sensor 39, and the like, and outputs a necessary control signal(s) to the pair of wheel drive units 14L and 14R.

As shown in FIG. 8, the control device 46 includes, for example, an arithmetic circuit 47 including a microcomputer (CPU), and a storage device 48 including a program memory, a data memory, and other RAMs and ROMs and the likes.

The battery 40 and the pair of drive circuits 44L and 44R are connected to the control device 46. Further, the battery 40 and the pair of drive circuits 44L and 44R are connected to each other through an emergency stop switch 49. The pair of drive circuits 44L and 44R independently control the rotation speeds, the rotation directions, and the likes of the pair of wheels 13L and 13R, and the pair of wheel drive units 14L and 14R are separately connected to the respective drive circuits 44L and 44R.

An operation signal from the turning operation ring 37, a measurement signal from the angle detection sensor 31, a measurement signal from the posture sensor unit 45, a getting-off assist start trigger signal from the getting-off switch 38, a foot measurement signal from the step sensor 39 are supplied to the control device 46.

The posture sensor unit 45 detects, for example, a pitch angle $\beta$, a pitch angular speed $\beta d$, an acceleration, and the like of the vehicle main body 12 while the coaxial two-wheeled vehicle 10 is traveling. Further, the posture sensor unit 45 is composed of, for example, a gyroscopic sensor and an acceleration sensor. When the operation lever 15 is tilted forward or backward, the step portions 11L and 11R of the vehicle main body 12 will be tilted to the same direction as that of the operation lever 15. The posture sensor unit 45 detects a pitch angular speed $\beta d$ and an acceleration corresponding to this tilting.

Then, the control device 46 performs drive control for the wheel drive units 14L and 14R based on the pitch angular speed $\beta d$ and the acceleration of the vehicle main body 12 detected by the posture sensor unit 45 so that the vehicle moves to the direction to which the operation lever 15 is tilted.

Figure 9:
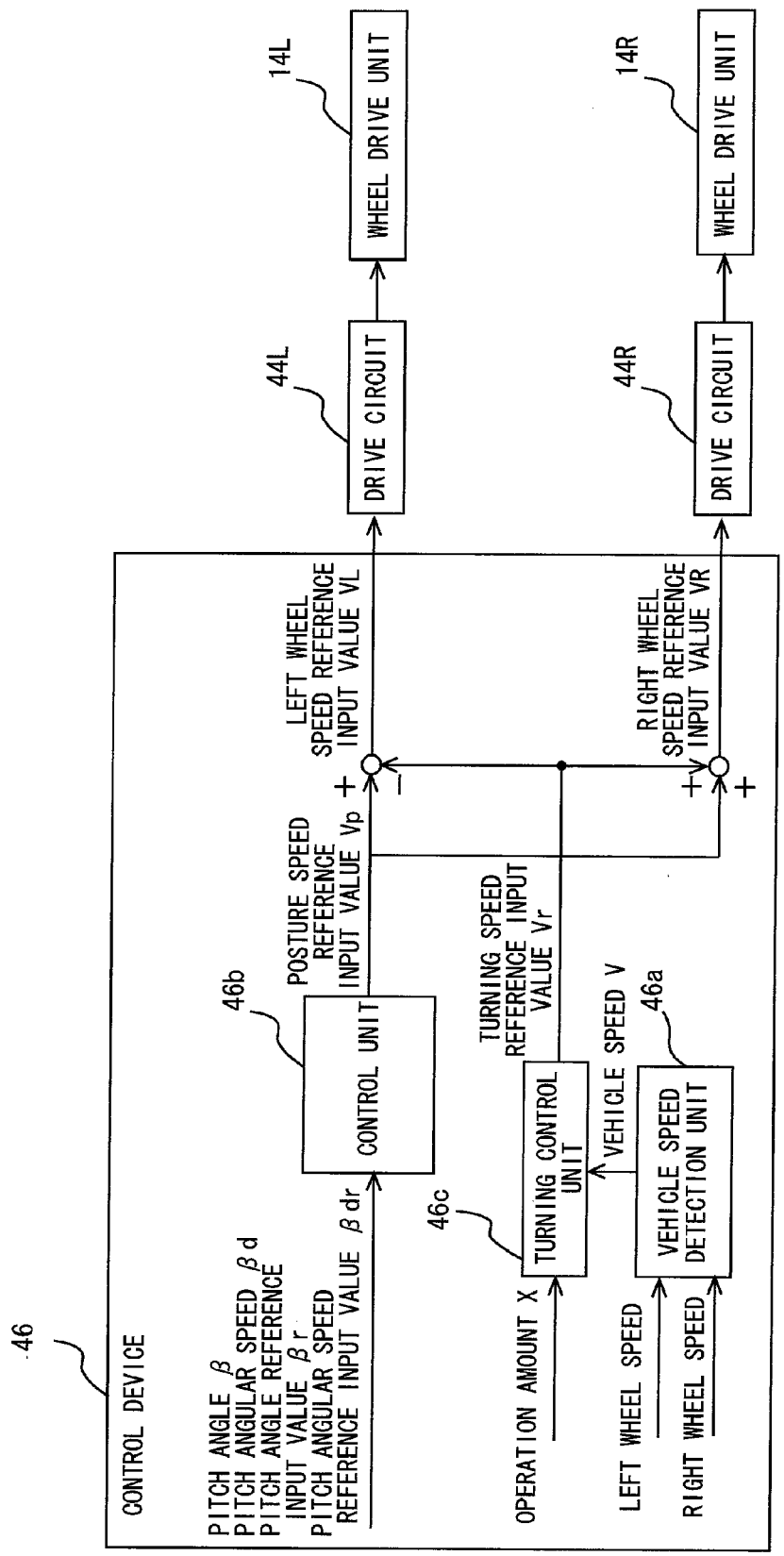
FIG. 9 is a control block diagram of a control portion of a coaxial two-wheeled vehicle in accordance with an exemplary embodiment of the present invention.

FIG. 9 is a control block diagram of a control device of a coaxial two-wheeled vehicle in accordance with third to fifth exemplary embodiments. The arithmetic circuit 47 of the control device 46 includes a vehicle speed detection unit 46a that detects the vehicle speed V of the coaxial two-wheeled vehicle 10, a control unit 46b that calculates a posture speed reference input value Vp, and a turning control unit 46c that calculates a turning speed reference input value Vr.

The vehicle speed detection unit 46a performs well-known arithmetic processing based on the wheel speeds of respective wheels 13L and 13R output from the wheel speed sensors 20L and 20R, and thereby detects the vehicle speed V of the coaxial two-wheeled vehicle 10.

The control unit 46b calculates a posture speed reference input value Vp based on the pitch angle $\beta$, the pitch angular speed $\beta d$, the pitch angle reference input value $\beta r$, and the pitch angular speed reference input value $\beta dr$ of the vehicle main body 12 detected by the posture sensor unit 45 by using the following (1) equation.

Posture speed reference input value $Vp=Kpp\cdot(\beta r-\beta)+Kdp\cdot(\beta dr-\beta d)+KipS\cdot(\beta r-\beta)dt$ (1) equation Note that in the above (1) equation, Kpp, Kdp and KipS are control gain parameters, and proper values are set to them. Further, the control unit 46b performs PID control such that each of differences between the input pitch angle reference input value $\beta r$ and the detected pitch angle $\beta$ and between the input pitch angular speed reference input value $\beta dr$ and the detected pitch angular speed $\beta d$ converges to zero.

For example, the pitch angle reference input value $\beta r$ and the pitch angular speed reference input value $\beta dr$ are set to zero, and the PID control is performed such that the pitch angle $\beta$ and the pitch angular speed $\beta d$ of the vehicle main body 12 that are produced by the shift of the center of gravity of the rider become zero. Note that an example where the control unit 46b performs PID control is explained above. However, it is not limited to this example, and state feedback control, H∞ control, fuzzy control, and the like may be also performed.

The turning control unit 46c calculates a turning speed reference input value Vr based on a tread width Lt, a yaw angle reference input value $\gamma dr$, and a wheel radius Rw by using the following (2) equation.

Turning speed reference input value $Vr=Lt\cdot\gamma dr/Rw$ (2) equation

Note that the tread width Lt and the wheel radius Rw are stored in advance in the storage device 48. Further, the turning control unit 46c calculates the yaw angle reference input value $\gamma dr$ in the above-described (2) equation based on a gain value G (which is explained later) and an operation amount X from the turning operation ring 37 by using the following (3) equation.

Yaw angle reference input value $\gamma dr=G\cdot X$ (3) equation

Note that although the turning control unit 46c calculates the yaw angle reference input value $\gamma dr$ based on an operation amount X from the turning operation ring 37, it may also calculates the yaw angle reference input value γdr based on an operation signal X from the angle detection sensor 31.

Further, the control device 46 calculates a left wheel speed reference input value VL based on the posture speed reference input value Vp calculated by the control unit 46b and the turning speed reference input value Vr calculated by the turning control unit 46c by using the following (4) equation.

Left wheel speed reference input value $VL$=Posture speed reference input value $Vp$-Turning speed reference input value $Vr$     (4) equation The control device 46 outputs the calculated left wheel speed reference input value VL to the left-side wheel drive unit 14L through the drive circuit 44L. The wheel drive unit 14L controls the wheel drive motor based on the left wheel speed reference input value VL, and thereby controls the rotation of the left wheel 13L.

Meanwhile, the control device 46 also calculates a right wheel speed reference input value VR based on the posture speed reference input value Vp calculated by the vehicle speed detection unit 46a and the turning speed reference input value Vr calculated by the turning control unit 46c by using the following (5) equation.

Right wheel speed reference input value $VR$=Posture speed reference input value $Vp$+Turning speed reference input value $Vr$     (5) equation The control device 46 outputs the calculated right wheel speed reference input value VR to the right-side wheel drive unit 14R through the drive circuit 44R. The wheel drive unit 14R controls the wheel drive motor based on the right wheel speed reference input value VR, and thereby controls the rotation of the right wheel 13R.

In the manner described above, the control device 46 controls the driving of the pair of wheel drive units 14L and 14R, and thereby produces a rotation difference between the left and right wheels 13L and 13R. In this way, it is possible to control turning traveling of the coaxial two-wheeled vehicle 10 in a desired turning direction at a desired vehicle speed.

For example, the turning control unit 46c can decrease the turning speed reference input value Vr by decreasing the gain value G in the above-described (3) equation. In this way, the difference between the left wheel speed reference input value VL and the right wheel speed reference input value VR is decreased, and therefore the rotation difference between the left and right wheels 13L and 13R decreases. By doing so, the turning radius of the coaxial two-wheeled vehicle 10 can be increased.

Incidentally, in a conventional coaxial two-wheeled vehicle, for example, if a rider performs a tuning movement of the coaxial two-wheeled vehicle by operating a turning operation ring in a state where the coaxial two-wheeled vehicle is traveling, there is a possibility of danger that the vehicle could tumble down to the outer side of the turning due to its centrifugal force. In particular, if the rider abruptly operates the turning operation ring, the rider has not completed a sufficient preparatory action in which the rider tilts the center of gravity to the inner side of the turning with respect to the vehicle body. Therefore, it could pose a possibility of danger that the vehicle could tumble down to the outer side of the turning as described above.

Therefore, in the coaxial two-wheeled vehicle 10 in accordance with the third exemplary embodiment, when turning control is performed according to an operation signal from the turning operation ring 37 while the vehicle is traveling, the control device 46 controls the driving of the wheel drive units 14L and 14R such that the turning radius becomes larger than that in the normal state.

In this way, the centrifugal force during a turning movement can be appropriately suppressed. Therefore, even if the rider abruptly operates the turning operation ring 37 while the vehicle is traveling, for example, the tumbling down to the outer side of the turning can be reliably prevented. That is, the safety of the coaxial two-wheeled vehicle 10 can be improved even further.

For example, in the case where turning control is performed according to an operation signal from the turning operation ring 37 while the vehicle is traveling, when the vehicle speed V supplied from the vehicle speed detection unit 46a is greater than or equal to a first threshold Va, the control device 46 preferably decreases the gain value G gradually as the vehicle speed V increases. In this way, the centrifugal force during a turning movement of the coaxial two-wheeled vehicle 10 can be appropriately suppressed.

Figure 10:
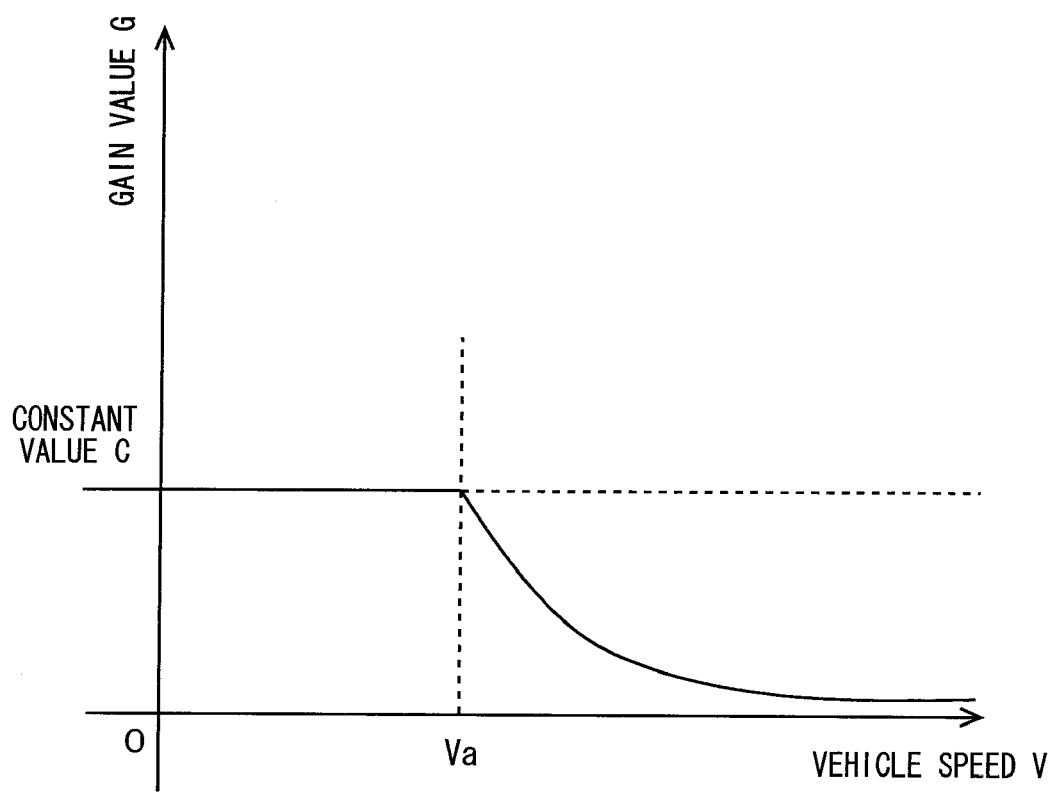
FIG. 10 is a graph showing an example of a state where a gain value G is gradually decreased in inverse proportion to a vehicle speed V.

More specifically, in the case where turning control is performed according to an operation signal from the turning operation ring 37 while the vehicle is traveling, when the vehicle speed V from the vehicle speed detection unit 46a is greater than or equal to a first threshold Va, the control device 46 preferably decreases the gain value G gradually in inverse proportion to the vehicle speed V (FIG. 10).

In other words, in the case where turning control is performed according to an operation signal from the turning operation ring 37 while the vehicle is traveling, when the vehicle speed V from the vehicle speed detection unit 46a is greater than or equal to a first threshold Va, the control device 46 preferably changes the gain value G such that the product of the vehicle speed V and the gain value G becomes a constant value. Note that when the vehicle speed V is smaller than the first threshold Va, the gain value G is a constant value C.

In this way, the gain value G can be changed smoothly with respect to the vehicle speed V. Therefore, the turning state of the coaxial two-wheeled vehicle 10 according to an operation of the turning operation ring 37 can be made more natural and smoother, and therefore better operability can be realized.

Further, as shown in FIG. 10, when the vehicle speed V is in the high-speed region, the gain value G corresponding to the vehicle speed V does not become zero, but does converge to a small value. Therefore, even in the high-speed region, the coaxial two-wheeled vehicle 10 performs a slight turning movement. Therefore, the rider can become aware naturally that the turning is restricted for the purpose of safety.

Figure 11:
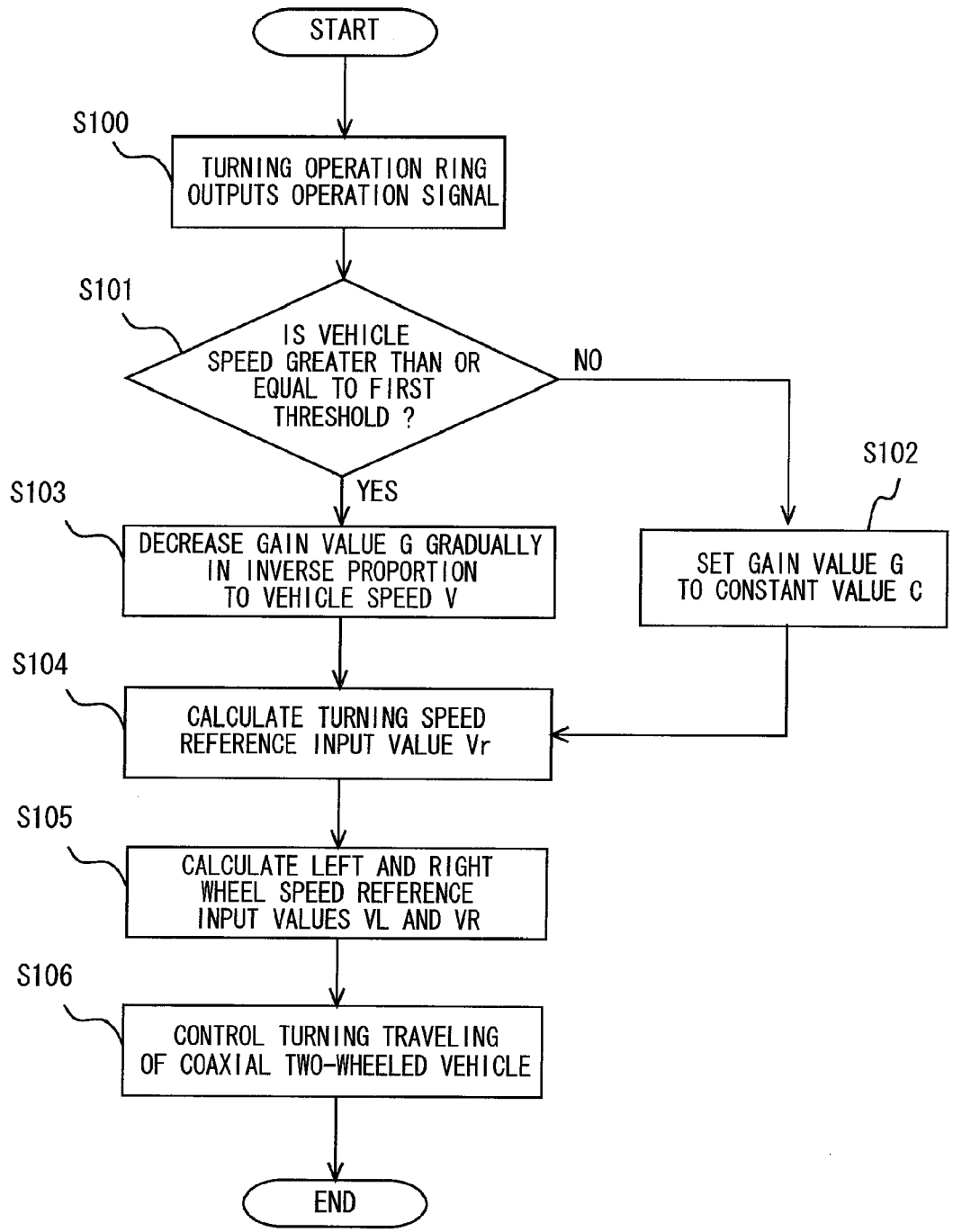
FIG. 11 is a flowchart showing an example of a control process flow of a coaxial two-wheeled vehicle in accordance with an exemplary embodiment of the present invention.

Next, a control process flow of a coaxial two-wheeled vehicle 10 in accordance with the third exemplary embodiment is explained. FIG. 11 is a flowchart showing an example of a control process flow of a coaxial two-wheeled vehicle in accordance with the third exemplary embodiment.

As shown in FIG. 11, when the turning operation ring 37 is rotationally operated by a rider, it outputs an operation signal according to its operation amount and operation direction to the control device 46 (step S100).

Next, the turning control unit 46c of the control device 46 determines whether or not the vehicle is traveling and the vehicle speed V supplied from the vehicle speed detection unit 46a is greater than or equal to the first threshold Va (step S101). When the turning control unit 46c determines that the vehicle speed V from the vehicle speed detection unit 46a is not greater than or equal to the first threshold Va (No at step S101), it sets the gain value G to the constant value C as shown in FIG. 10 (step S102) and the process moves to a step described below (step S104).

On the other hand, when the turning control unit 46c determines that the vehicle speed V from the vehicle speed detection unit 46a is greater than or equal to the first threshold Va (Yes at step S101), it gradually decrease the gain value G in inverse proportion to the vehicle speed V as shown in FIG. 10 (step S103) and the process moves to a step described below (step S104).

By gradually decreasing the gain value G in inverse proportion to the vehicle speed V in this manner, the turning speed reference input value Vr is decreased, and the difference between the left wheel speed reference input value VL and the right wheel speed reference input value VR is thereby decreased. By doing so, the rotation difference between the left and right wheels 13L and 13R can be decreased. Therefore, by increasing the turning radius of the coaxial two-wheeled vehicle 10 during a turning movement, its centrifugal force can be moderately suppressed.

The turning control unit 46c calculates a turning speed reference input value Vr based on the above-described calculated gain value and an operation amount X from the turning operation ring 37 (step S104).

Next, the turning control unit 46c calculates left and right wheel speed reference input values VL and VR based on a posture speed reference input value Vp supplied from the control unit 46b and the calculated turning speed reference input value Vr, and outputs the calculated reference input values VL and VR to the wheel drive units 14L and 14R through the drive circuits 44L and 44R (step S105). The wheel drive units 14L and 14R control the left and right wheels 13L and 13R respectively, and thereby control the turning traveling of the coaxial two-wheeled vehicle 10 in a desired turning direction at a desired vehicle speed (step S106).

As described so far, in a coaxial two-wheeled vehicle 10 in accordance with the third exemplary embodiment, when turning control is performed according to an operation signal from the turning operation ring 37 while the vehicle is traveling, the control device 46 controls the driving of the wheel drive units 14L and 14R such that the turning radius becomes larger than that in the normal state. In this way, the centrifugal force during a turning movement of the coaxial two-wheeled vehicle 10 can be appropriately suppressed. Therefore, even if the rider abruptly operates the turning operation ring 37 while the vehicle is traveling, the tumbling down to the outer side of the turning can be reliably prevented. That is, the safety of the coaxial two-wheeled vehicle 10 can be improved even further.

Figure 12:
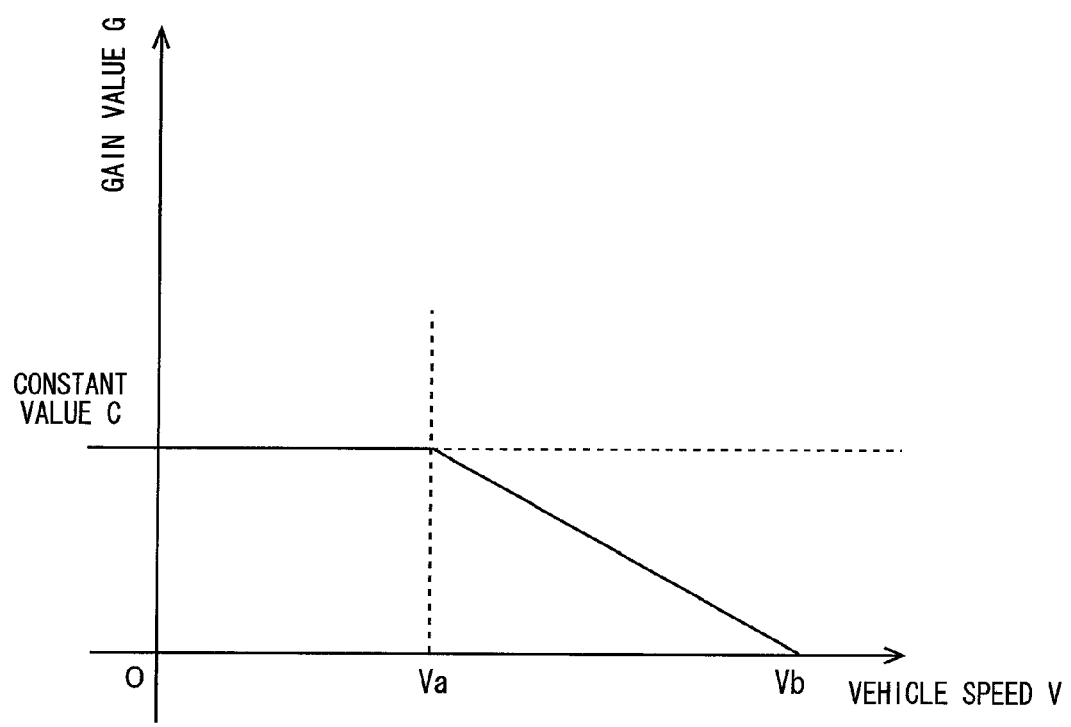
FIG. 12 is a graph showing an example of a state where a gain value G is gradually decreased in proportion to a vehicle speed V.

Further, for example, in the above-described third exemplary embodiment, when the vehicle speed V from the vehicle speed detection unit 46a is greater than or equal to the first threshold Va, the control device 46 may decrease the gain value G gradually in proportion to the vehicle speed V increases. In addition, when the vehicle speed V is greater than or equal to the second threshold Va, the control device 46 may set the gain value G to roughly zero (FIG. 12). Note that as shown in FIG. 12, it is assumed that the gain value G gradually decreases according to a linear expression having a sufficiently gentle slope with respect to the vehicle speed V.

Further, in the above-described third exemplary embodiment, the control device 46 makes the turning radius larger than that in the normal state by decreasing the gain value G when turning control is performed according to an operation signal from the turning operation ring 37 while the vehicle is traveling. However, it is not limited to this control method. For example, the turning radius may be increased by lowering the operation sensitivity to an operation signal from the turning operation ring 37. That is, any technique can be applied, provided that the turning radius during a turning movement can be increased and that the centrifugal force of the coaxial two-wheeled vehicle 10 can be thereby appropriately suppressed.

Fourth Exemplary Embodiment of the Invention

Figure 13:
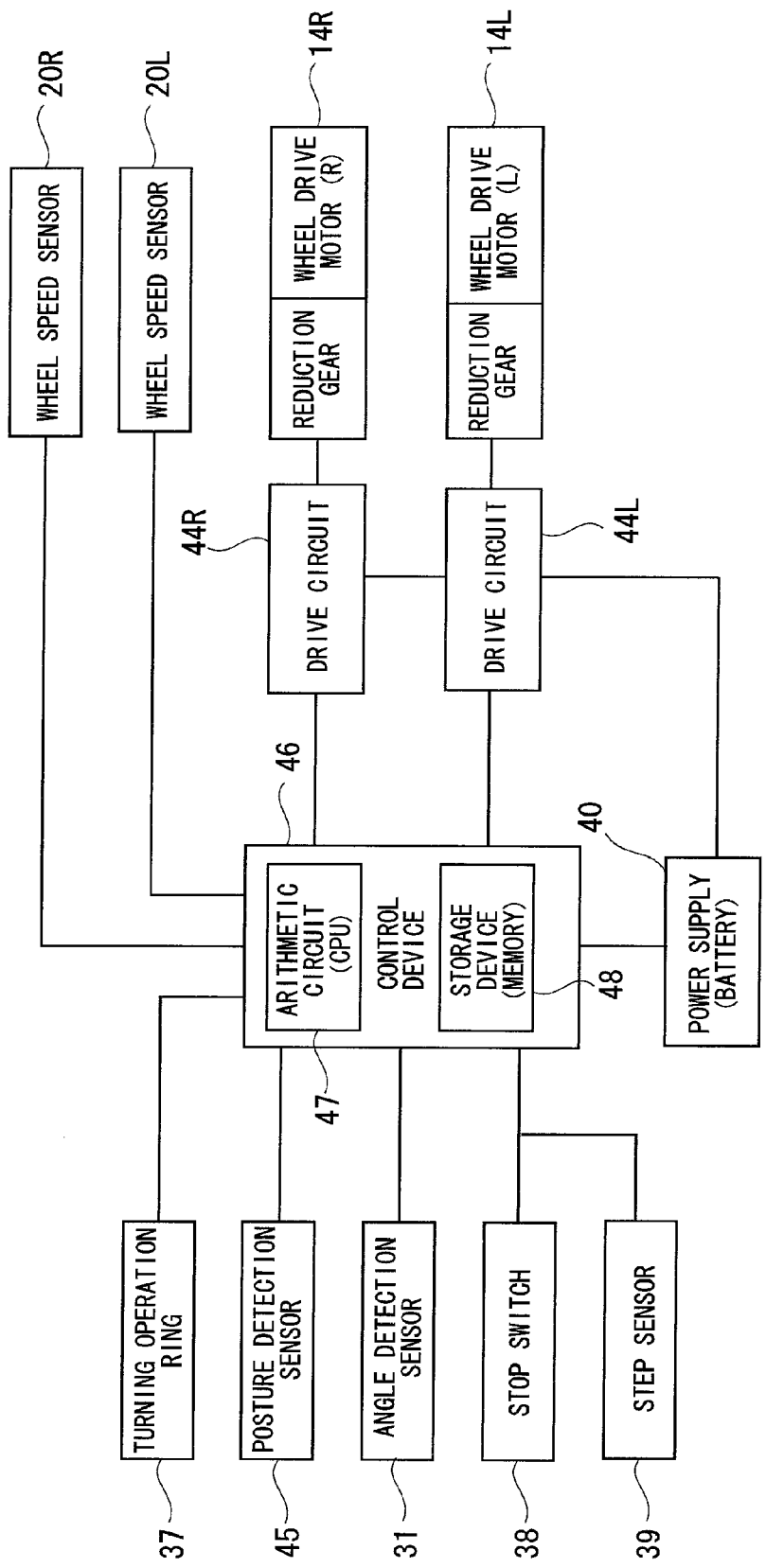
FIG. 13 is a block diagram showing an example of a system configuration of a coaxial two-wheeled vehicle in accordance with an exemplary embodiment of the present invention.

FIG. 13 is a block diagram showing an example of a system configuration of a coaxial two-wheeled vehicle in accordance with a fourth exemplary embodiment of the present invention. A coaxial two-wheeled vehicle 10 in accordance with this exemplary embodiment includes a vehicle main body 12, wheels 13L and 13R, wheel drive units 14L and 14R, an operation lever 15, and a control device 46.

An angle detection sensor 31 is attached to the rotation support shaft 25 of the operation lever 15. For example, a potentiometer, a sensor having a variable-condenser structure, or the like can be used as the angle detection sensor 31. When the operation lever 15 is rotated to a desired direction to which the rider wants to turn by the rider, the angle detection sensor 31 detects its operation amount and operation direction (FIG. 7). The angle detection sensor 31 supplies an operation signal according to the detected operation amount and operation direction to the control device 46. Then, the control device 46 controls the driving of the pair of wheel drive units 14L and 14R according to the operation signal from the angle detection sensor 31, and thereby produces a rotation difference between the left and right wheels 13L and 13R. In this way, the coaxial two-wheeled vehicle 10 can perform turning traveling in a desired direction at a desired vehicle speed.

A stop switch 38 used to decelerate and stop the coaxial two-wheeled vehicle 10 is provided on the upper end portion of the other protruding portion of the handle lever 36. The stop switch 38 is a switch that generates a brake control start trigger signal. The brake control start trigger signal is used as a trigger to cause the control device 46 to perform brake control.

When a rider pushes down the stop switch 38, the stop switch 38 supplies a brake control start trigger signal to the control device 46. The control device 46 starts to perform brake control to decelerate the coaxial two-wheeled vehicle 10 in response to the brake control start trigger signal from the stop switch 38.

Note that the control device 46 may also perform getting-off assist control to help the rider to get off the vehicle, in addition to performing the brake control in response to the brake control start trigger signal from the stop switch 38. The control device 46 performs predetermined arithmetic processing based on an operation signal from the turning operation ring 37, a measurement signal from the posture sensor unit 45, an operation signal from the angle detection sensor 31, a brake control start trigger signal from the stop switch 38, a foot measurement signal from the step sensor 39, and the like, and outputs a necessary control signal(s) to the pair of wheel drive units 14L and 14R.

An operation signal from the turning operation ring 37, an operation signal from the angle detection sensor 31, a measurement signal from the posture sensor unit 45, a brake control start trigger signal from the stop switch 38, a foot measurement signal from the step sensor 39 are supplied to the control device 46.

Incidentally, for the purpose of obtaining natural steering feeling, the control device 46 typically performs such turning control that the tuning radius increases as the vehicle speed V detected by the turning control unit 46c increases. However, in a conventional coaxial two-wheeled vehicle using only this turning control, for example, when brake (deceleration) control is performed during a turning movement and the vehicle speed decreases, the turning radius decreases and thus causing an unnatural movement called "rolling-in movement" of the vehicle. This unnatural rolling-in movement lowers the operability of the coaxial two-wheeled vehicle, thus posing a possibility that the safety could be impaired.

Therefore, in the coaxial two-wheeled vehicle 10 in accordance with the fourth exemplary embodiment, when the control device 46 determines that a brake control action is initiated during a tuning movement, the control device 46 performs turning control so as to suppress the decrease of the tuning radius. In this way, it is possible to suppress the unnatural rolling-in movement, which would otherwise occur when the speed decreases during a tuning movement as described above. Therefore, more natural operability can be realized, and the safety of the coaxial two-wheeled vehicle 10 can be improved.

Figure 14:
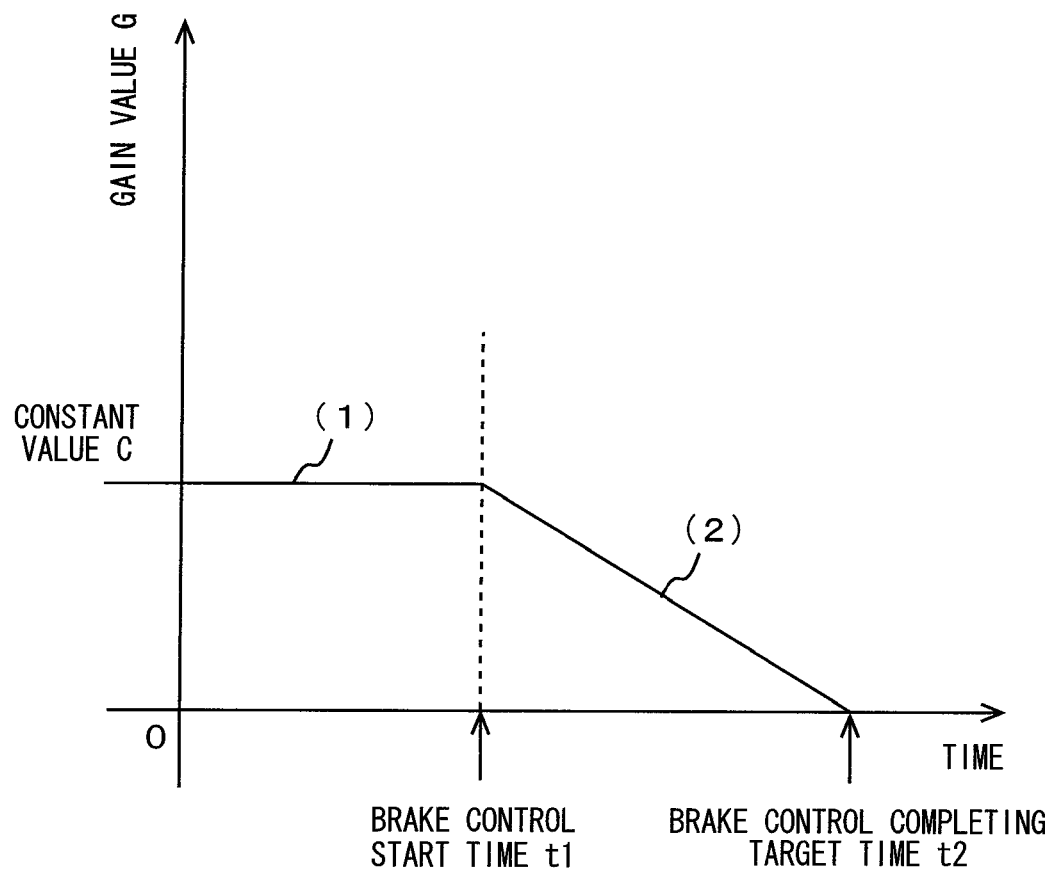
FIG. 14 is a graph showing an example of a state where a gain value is decreased in proportion to time when a brake control action is initiated during a turning movement.

For example, the turning control unit 46c of the control device 46 sets the gain value G to a constant value C (FIG. 14 (1)) and calculates a tuning speed reference input value Vr by using above-shown (2) equation and (3) equation in the normal traveling state. On the other hand, when the turning control unit 46c determines that a brake control action is initiated (brake control start time t1) during a tuning movement, the control device 46 decreases the gain value G in proportion to time (FIG. 14 (2)).

In this way, the tuning speed reference input value Vr decreases; the difference between the left wheel speed reference input value VL and the right wheel speed reference input value VR decreases; and the rotation difference between the left and right wheels 13L and 13R decreases. Therefore, the decrease of the turning radius of the coaxial two-wheeled vehicle 10 can be suppressed, and the unnatural rolling-in movement, which would otherwise occur when the speed decreases during a tuning movement as described above, can be thereby suppressed.

Further, after the brake control action is started, the turning control unit 46c performs setting such that the gain value G becomes zero at a brake control completion target time t2 at which the brake control is completed and the vehicle speed V becomes roughly zero. Note that there is a possibility that, after the brake control action is started, the coaxial two-wheeled vehicle 10 could stop before the brake control completion target time t2 due to disturbances from the road surface E (unevenness and the like), disturbances of the posture of the rider, and the like. Therefore, to take such situations into consideration, in actual practice, the turning control unit 46c preferably performs setting such that the gain value G becomes zero before the brake control completion target time t2.

Figure 15:
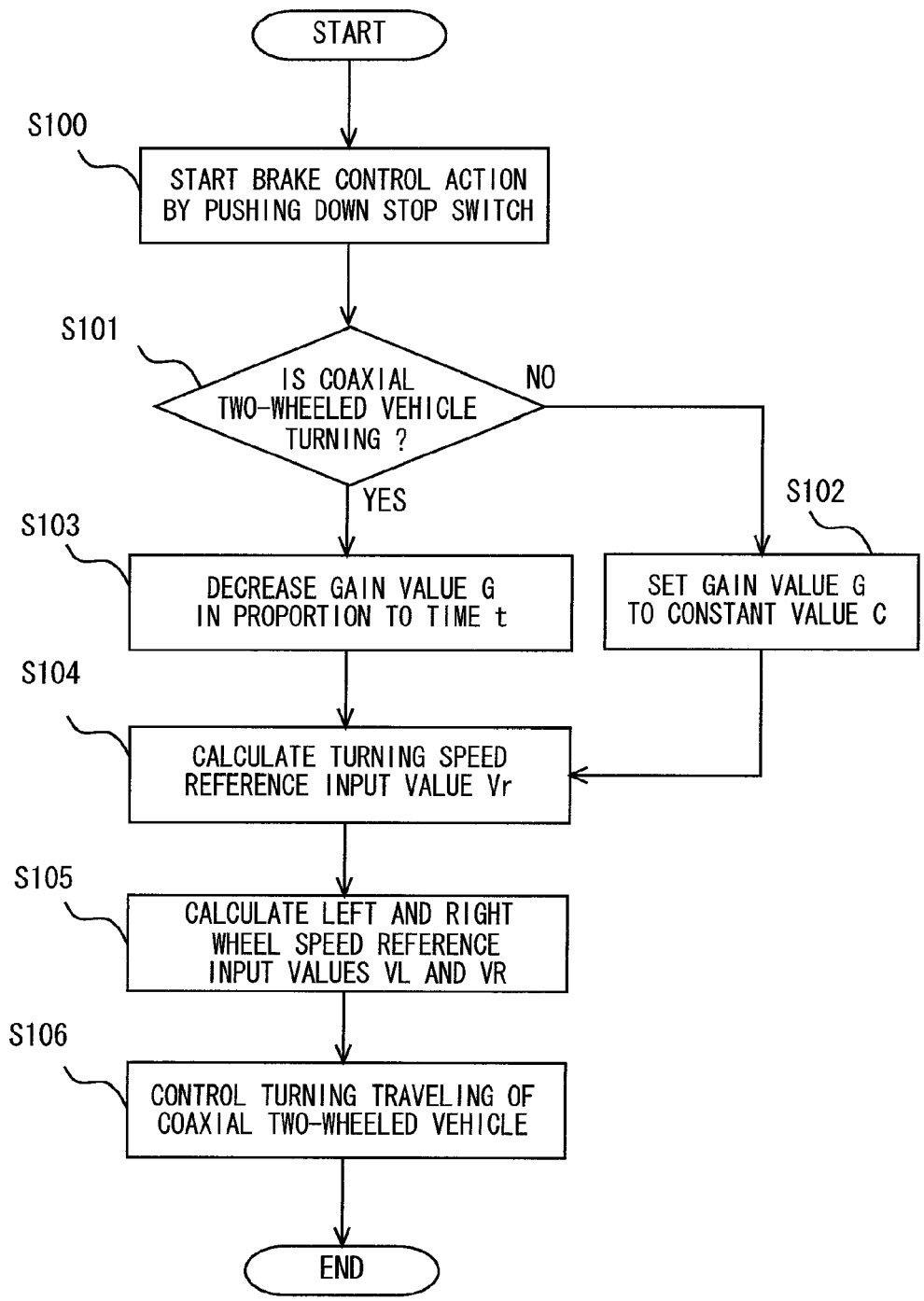
FIG. 15 is a flowchart showing an example of a control process flow of a coaxial two-wheeled vehicle in accordance with an exemplary embodiment of the present invention.

Next, a control process flow of the coaxial two-wheeled vehicle 10 in accordance with the fourth exemplary embodiment is explained. FIG. 15 is a flowchart showing an example of a control process flow of a coaxial two-wheeled vehicle in accordance with the fourth exemplary embodiment.

When a rider pushes down the stop switch 38, a brake control start trigger signal is supplied to the control device 46. The control device 46 starts to perform brake control to decelerate the coaxial two-wheeled vehicle 10 in response to the brake control start trigger signal (step S100).

Next, the turning control unit 46c of the control device 46 determines whether or not the coaxial two-wheeled vehicle 10 is performing a tuning movement based on an operation signal from the turning operation ring 37 (or angle detection sensor 31) (step S101).

When the turning control unit 46c determines that the coaxial two-wheeled vehicle 10 is not performing a turning movement (No at step S101), it sets the gain value G to a constant value C (step S102) and the process moves to a step described below (step S104).

On the other hand, when the turning control unit 46c determines that the coaxial two-wheeled vehicle 10 is performing a turning movement (Yes at step S101), it gradually decreases the gain value G in proportion to time as shown in FIG. 14 (2) (step S103) and the process moves to a step described below (step S104).

By gradually decreasing the gain value G in proportion to time in this manner, the turning speed reference input value Vr is decreased, and the difference between the left wheel speed reference input value VL and the right wheel speed reference input value VR is thereby decreased. By doing so, the rotation difference between the left and right wheels 13L and 13R can be decreased. Therefore, the decrease in turning radius during the brake control action of the coaxial two-wheeled vehicle 10 can be suppressed, and the situation where the turning traveling track rolls in toward the inner side of the turning during deceleration can be thereby appropriately suppressed.

Next, the turning control unit 46c calculates a turning speed reference input value Vr based on the above-described calculated gain value G and an operation amount X from the turning operation ring 37 (step S104).

After that, the turning control unit 46c calculates left and right wheel speed reference input values VL and VR based on a posture speed reference input value Vp from the control unit 46b and the calculated turning speed reference input value Vr, and outputs the calculated reference input values VL and VR to the wheel drive units 14L and 14R through the drive circuits 44L and 44R (step S105).

The wheel drive units 14L and 14R control the left and right wheels 13L and 13R, and thereby control the turning traveling of the coaxial two-wheeled vehicle 10 in a desired turning direction at a desired vehicle speed (step S106).

As described above, in a coaxial two-wheeled vehicle 10 in accordance with the fourth exemplary embodiment, when the control device 46 determines that a brake control action is initiated during a turning movement, it decrease the gain value G in proportion to time and thereby performs turning control so as to suppress the decrease of the turning radius. In this way, it is possible to suppress the unnatural rolling-in movement, which would otherwise occur when the speed decreases during a tuning movement. Therefore, more natural operability can be realized, and the safety of the coaxial two-wheeled vehicle 10 can be improved.

Fifth Exemplary Embodiment of the Invention

Figure 16:
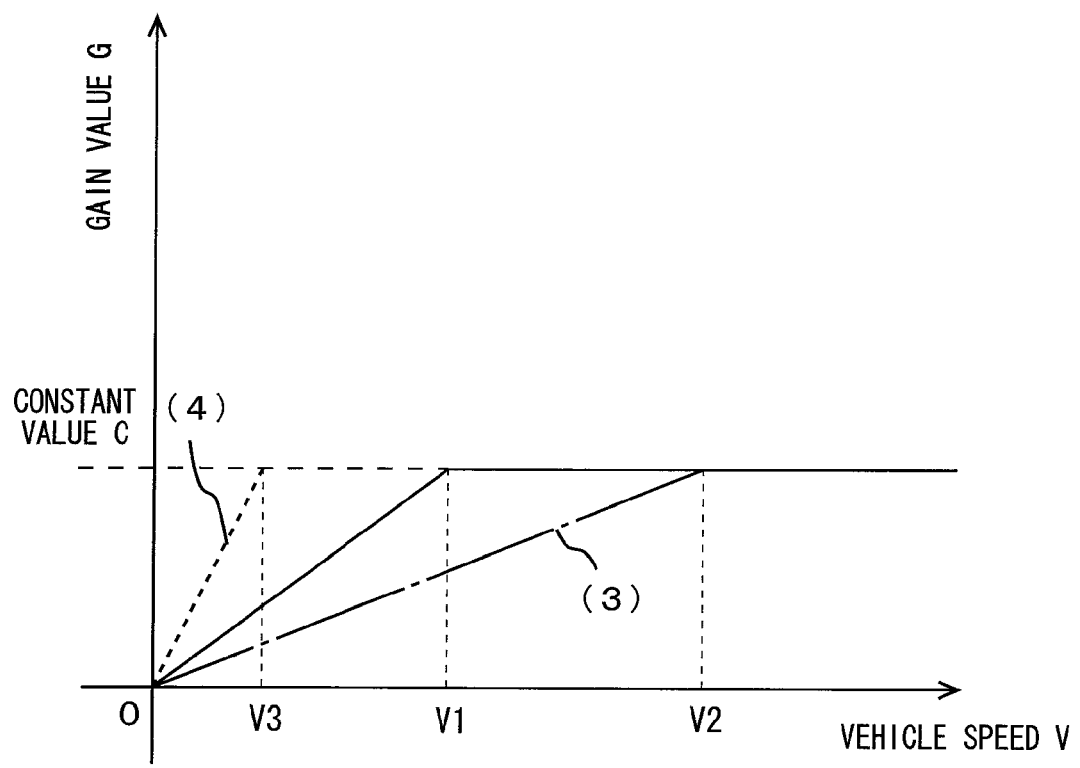
FIG. 16 is a graph showing an example of a state where a gain value is decreased in proportion to a vehicle speed when a brake control action is initiated during a turning movement.

The control device 46 of the coaxial two-wheeled vehicle 10 in accordance with the above-described fourth exemplary embodiment decreases the gain value G in proportion to time when it determines that a brake control action is initiated during a tuning movement. In contrast to this, the control device 46 of a coaxial two-wheeled vehicle 10 in accordance with a fifth exemplary embodiment decreases the gain value G in proportion to the vehicle speed V when it determines that a brake control action is initiated during a tuning movement (FIG. 16).

More specifically, the turning control unit 46c first retains a vehicle speed V1 at a time when a brake control action is initiated. Then, the turning control unit 46c calculates a proportionality factor α (α=C/V1) between the gain value G and the vehicle speed V at the time of the brake control during the turning movement based on the vehicle speed V1 and the gain value G (=constant value C), and thereby derives a relational expression (6) between the gain value G and the vehicle speed V.

$$\text{Gain value } G = \text{Vehicle speed } V \cdot (C/V1) \qquad (6) \text{ equation}$$

The turning control unit 46c calculates a turning speed reference input value Vr based on the gain value G calculated by the above-shown (6) equation by using the above-shown (2) equation and (3) equation. In this way, the turning speed reference input value Vr is decreased as the vehicle speed V is lowered by the brake control action, and the difference between the left wheel speed reference input value VL and the right wheel speed reference input value VR is thereby decreased. By doing so, the rotation difference between the left and right wheels 13L and 13R can be decreased. Therefore, the decrease of the turning radius during the brake control action of the coaxial two-wheeled vehicle 10 can be suppressed, and the situation where the turning traveling track rolls in toward the inner side of the turning during deceleration can be thereby suppressed.

Note that as shown in FIG. 16, if the vehicle speed V2 at a time when a brake control action is initiated is large to some extent (indicated by the dashed dotted line (3) in FIG. 16), a larger deceleration becomes possible. Therefore, the gain value G can be decreased with a moderate gradient, and the turning speed reference input value Vr can be decreased. By doing so, appropriate turning control can be performed. On the other hand, if the vehicle speed V3 at a time when a brake control action is initiated is small (indicated by the dotted line (4) in FIG. 16), the gain value G decreases sharply and the turning speed reference input value Vr decreases.

Therefore, if the turning control unit 46c determines that a brake control action is initiated during a turning movement, the tuning control unit 46C (a) decreases the gain value and thus decreases the turning speed reference input value Vr as time elapses when the vehicle speed V from the vehicle speed detection unit 46a is less than a predetermined value Va, and (b) decreases the gain value and thus decreases the turning speed reference input value Vr as the vehicle speed falls when the vehicle speed V from the vehicle speed detection unit 46a is greater than or equal to the predetermined value Va. In this way, more natural turning control can be realized in a state where the vehicle speed V is small at a time when a brake control action is initiated.

Note that other structures of the coaxial two-wheeled vehicle 10 in accordance with the fifth exemplary embodiment are roughly the same as those of the coaxial two-wheeled vehicle 10 in accordance with the fourth exemplary embodiment, and therefore their detailed explanation is omitted.

Figure 17:
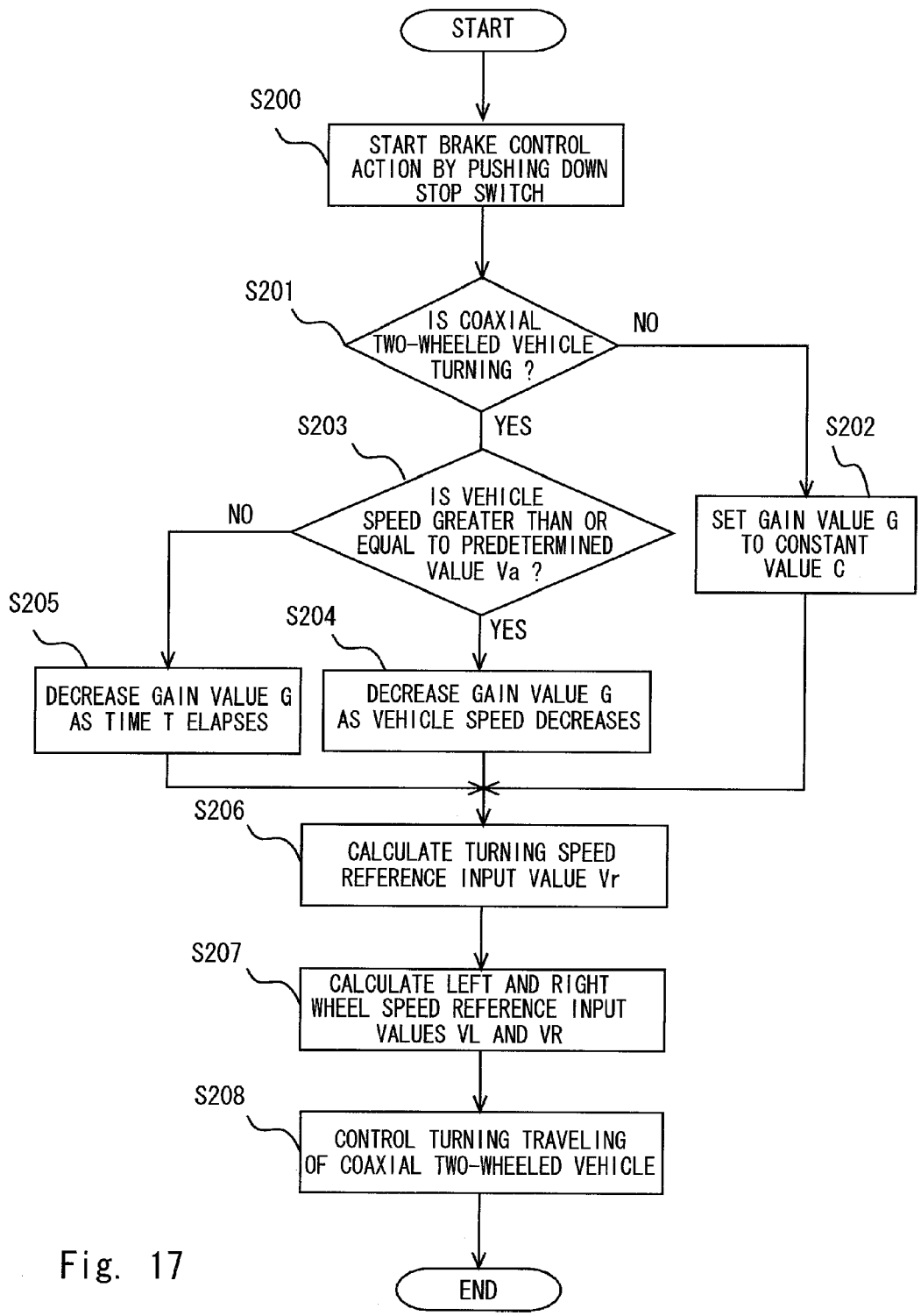
FIG. 17 is a flowchart showing an example of a control process flow of a coaxial two-wheeled vehicle in accordance with an exemplary embodiment of the present invention.

FIG. 17 is a flowchart showing an example of a control process flow of a coaxial two-wheeled vehicle in accordance with the fifth exemplary embodiment.

As shown in FIG. 17, when a rider pushes down the stop switch 38, a brake control start trigger signal is supplied to the control device 46. The control device 46 starts to perform brake control in response to the brake control start trigger signal (step S200).

Next, the turning control unit 46c of the control device 46 determines whether or not the coaxial two-wheeled vehicle 10 is performing a tuning movement based on an operation signal from the turning operation ring 37 (or angle detection sensor 31) (step S201). When the turning control unit 46c determines that the coaxial two-wheeled vehicle 10 is not performing a turning movement (No at step S201), it sets the gain value G to a constant value C (step S202) and the process moves to a step described below (step S206).

On the other hand, when the turning control unit 46c determines that the coaxial two-wheeled vehicle 10 is performing a turning movement (Yes at step S201), it determines whether or not the vehicle speed V at a time when a brake control action is initiated is greater than or equal to a predetermined value Va (step S203).

When the turning control unit 46c determines that the vehicle speed V at the time when a brake control action is initiated is greater than or equal to the predetermined value Va (Yes at step S203), it (b) decreases the gain value G as the vehicle speed V falls as shown in FIG. 16 (step S204) and the process moves to a step described below (step S206).

On the other hand, when the turning control unit 46c determines that the vehicle speed V at the time when a brake control action is initiated is not greater than or equal to the predetermined value Va (No at step S203), it (a) decreases the gain value G as time elapses as shown in FIG. 14 (step S205) and the process moves to a step described below (step S206).

Next, the turning control unit 46c calculates a turning speed reference input value Vr based on the above-described calculated gain value G and an operation amount X from the turning operation ring 37 (step S206).

After that, the turning control unit 46c calculates left and right wheel speed reference input values VL and VR based on a posture speed reference input value Vp supplied from the control unit 46b and the calculated turning speed reference input value Vr, and outputs the calculated reference input values VL and VR to the wheel drive units 14L and 14R through the drive circuits 44L and 44R (step S207).

The wheel drive units 14L and 14R control the left and right wheels 13L and 13R, and thereby control the turning traveling of the coaxial two-wheeled vehicle 10 in a desired turning direction at a desired vehicle speed (step S208).

As described above, in a coaxial two-wheeled vehicle 10 in accordance with the fifth exemplary embodiment, if the control device 46 determines that a brake control action is initiated during a turning movement, the control device 46 (a) decreases the gain value and thus decreases the turning speed reference input value Vr as time elapses when the vehicle speed V from the vehicle speed detection unit 46a is less than the predetermined value Va, and (b) decreases the gain value and thus decreases the turning speed reference input value Vr as the vehicle speed falls when the vehicle speed V from the vehicle speed detection unit 46a is greater than or equal to the predetermined value Va. In this way, the decrease in turning radius during the brake control action of the coaxial two-wheeled vehicle 10 can be suppressed, and the unnatural rolling-in movement, which would otherwise occur when the speed decreases during a tuning movement, can be thereby suppressed. Therefore, more natural operability can be realized, and the safety of the coaxial two-wheeled vehicle 10 can be improved.

Although the invention of the present application is explained above with reference to exemplary embodiments, the invention of the present application is not limited to the above description. Various modifications that can be understood by those skilled in the art can be made to the components and details of the invention of the present application without departing from the scope of the invention.

For example, in the above-described fourth and fifth exemplary embodiments, if the control device 46 determines that a brake control action is initiated during a turning movement, it suppresses the decrease of the turning radius by decreasing the gain value G. However, it is not limited to these examples, and the control device 46 may suppress the decrease of the turning radius by lowering the operation sensitivity to an operation signal from the turning operation ring 37 (operation lever 15).

That is, any technique can be applied, provided that the decrease of the turning radius at the time of the brake control during the turning movement can be suppressed and that the unnatural rolling-in movement of the coaxial two-wheeled vehicle 10 can be thereby suppressed.

Further, in the above-described fourth and fifth exemplary embodiments, the control device 46 starts a brake control action by using a brake control start trigger signal from the stop switch 38. However, it is not limited to these examples, and the control device 46 may start a brake control action in response to any given trigger signal.

Reference Signs List
1 DETECTOR
2 TURNING OPERATION DEVICE
3 CONTROL DEVICE
4 DRIVE UNIT
5 ALARM DEVICE

The invention claimed is:

1. A coaxial two-wheeled vehicle comprising: drive means to drive two coaxially-arranged wheels; turning command input means to input a turning command; and control means to control the drive means according to a turning gain based on a turning command input by the turning command input means to thereby perform a turning movement, wherein the control means brings the turning gain to substantially zero when the coaxial two-wheeled vehicle is in a backward traveling state with a backward velocity greater than or equal to a first velocity, and sets the turning gain to a value greater than zero when a vehicle velocity is substantially zero, wherein the control means has a forward traveling mode and a backward traveling mode with regard to the turning gain, in the forward traveling mode, the control means brings the turning gain to substantially zero when the coaxial two-wheeled vehicle is in a backward traveling state with a backward velocity greater than or equal to the first velocity, and sets the turning gain to a value greater than zero when the vehicle velocity is substantially zero, and in the backward traveling mode, assuming that a forward direction is positive and a backward direction is negative, the turning gain is increased as a vehicle velocity value increases, and set to substantially zero when the vehicle velocity is substantially zero.

2. The coaxial two-wheeled vehicle according to claim 1, wherein the control means changes the turning gain in a continuous manner in a backward traveling state between the first velocity and a velocity of zero.

3. The coaxial two-wheeled vehicle according to claim 1, wherein in a situation where the control means performs control in the forward traveling mode and the coaxial two-wheeled vehicle is moving backward, when the coaxial two-wheeled vehicle reaches a second velocity lower than the first velocity while being in a non-turning state, the control means switches from the forward traveling mode to the backward traveling mode.

4. The coaxial two-wheeled vehicle according to claim 3, wherein in a situation where the control means performs control in the backward traveling mode and the coaxial two-wheeled vehicle is moving backward, when the coaxial two-wheeled vehicle reaches a third velocity lower than the second velocity while being in a non-turning state, the control means switches from the backward traveling mode to the forward traveling mode.

5. The coaxial two-wheeled vehicle according to claim 1, wherein in a situation where the control means performs control in the backward traveling mode and the coaxial two-wheeled vehicle is moving forward, when the coaxial two-wheeled vehicle reaches a fourth at which a turning gain coincides between a forward traveling mode and a backward traveling mode, the control means switches from the backward traveling mode to the forward traveling mode.

6. A control method for a coaxial two-wheeled vehicle to make the coaxial two-wheeled vehicle perform a turning movement by controlling drive means according to a turning gain based on a turning command input by a turning command input means,
wherein the turning gain is brought to substantially zero when the coaxial two-wheeled vehicle is in a backward traveling state with a backward velocity greater than or equal to a first velocity, and the turning gain is set to a value greater than zero when a vehicle velocity is substantially zero,
wherein the turning gain has a forward traveling mode and a backward traveling mode,
in the forward traveling mode, a control means brings the turning gain to substantially zero when the coaxial two-wheeled vehicle is in a backward traveling state with a backward velocity greater than or equal to the first velocity, and sets the turning gain to a value greater than zero when a vehicle velocity is substantially zero, and
in the backward traveling mode, assuming that a forward direction is positive and a backward direction is negative, the turning gain is increased as a vehicle velocity value increases, and set to substantially zero when the vehicle velocity is substantially zero.

7. The control method for a coaxial two-wheeled vehicle according to claim 6, the turning gain is changed in a continuous manner in a backward traveling state between the first velocity and a velocity of zero.

8. The control method for a coaxial two-wheeled vehicle according to claim 6, wherein in a situation where control is performed in the forward traveling mode and the coaxial two-wheeled vehicle is moving backward, when the vehicle reaches a second velocity lower than the first velocity while being in a non-turning state, the traveling mode is switched from the forward traveling mode to the backward traveling mode.

9. The control method for a coaxial two-wheeled vehicle according to claim 8, wherein in a situation where control is performed in the backward traveling mode and the coaxial two-wheeled vehicle is moving backward, when the vehicle reaches a third velocity lower than the second velocity while being in a non-turning state, the traveling mode is switched from the backward traveling mode to the forward traveling mode.

10. The control method for a coaxial two-wheeled vehicle according to claim 6, wherein in a situation where control is performed in the backward traveling mode and the coaxial two-wheeled vehicle is moving forward, the vehicle reaches a fourth velocity at which a turning gain coincides between a forward traveling mode and a backward traveling mode, the traveling mode is switched from the backward traveling mode to the forward traveling mode.

11. A coaxial two-wheeled vehicle comprising: a drive unit that drives two coaxially-arranged wheels; a turning command input portion that inputs a turning command; and a control device that controls the drive unit according to a turning gain based on a turning command input by the turning command input portion to thereby perform a turning movement, wherein the control device brings the turning gain to substantially zero when the coaxial two-wheeled vehicle is in a backward traveling state with a backward velocity greater than or equal to a first velocity, and sets the turning gain to a value greater than zero when a vehicle velocity is substantially zero, wherein the control means has a forward traveling mode and a backward traveling mode with regard to the turning gain, in the forward traveling mode, the control means brings the turning gain to substantially zero when the coaxial two-wheeled vehicle is in a backward traveling state with a backward velocity greater than or equal to the first velocity, and sets the turning gain to a value greater than zero when the vehicle velocity is substantially zero, and in the backward traveling mode, assuming that a forward direction is positive and a backward direction is negative, the turning gain is increased as a vehicle velocity value increases, and set to substantially zero when the vehicle velocity is substantially zero.

* * * * *